United States Patent
Ozeki et al.

(10) Patent No.: US 8,009,541 B2
(45) Date of Patent: Aug. 30, 2011

(54) DEVICE, METHOD, AND COMPUTER PROGRAM PRODUCT FOR DATA MIGRATION

(75) Inventors: Kazuhiro Ozeki, Kanagawa-ken (JP);
Shinobu Fujihara, Kanagawa-ken (JP);
Hiroshi Itagaki, Kanagawa-ken (JP);
Takeshi Ishimoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/643,194

(22) Filed: Dec. 21, 2009

(65) Prior Publication Data
US 2011/0149707 A1  Jun. 23, 2011

(51) Int. Cl.
G11B 7/00 (2006.01)
G11B 5/09 (2006.01)

(52) U.S. Cl. ............ 369/84; 369/85; 369/47.12; 360/39

(58) Field of Classification Search .................. None
See application file for complete search history.

(56) References Cited

U.S. PATENT DOCUMENTS

| | | | | |
|---|---|---|---|---|
| 7,188,218 B2 * | 3/2007 | Morishita et al. | ............. | 711/147 |
| 7,227,821 B2 * | 6/2007 | Horii et al. | ................. | 369/47.16 |
| 7,830,769 B2 * | 11/2010 | Yamamoto et al. | ........ | 369/59.25 |
| 2002/0036858 A1 * | 3/2002 | Bi et al. | .......................... | 360/75 |

FOREIGN PATENT DOCUMENTS

| | | | |
|---|---|---|---|
| JP | 8263335 | A | 10/1996 |
| JP | 9069028 | A | 3/1997 |
| JP | 9161405 | A | 6/1997 |
| JP | 11031376 | A | 2/1999 |
| JP | 11306690 | A | 11/1999 |
| JP | 2006293981 | A | 10/2006 |
| JP | 2007164650 | A | 6/2007 |

* cited by examiner

*Primary Examiner* — Muhammad N Edun
(74) *Attorney, Agent, or Firm* — Cynthia Seal; Adam Steadman

(57) ABSTRACT

A device, method, and computer program product are provided for migrating pieces of data from a first recording location to a second recording location based on access frequency. The device comprises an obtaining unit for obtaining, for each of the pieces of data, first information indicating the number of times any data has been read from the first recording location after the piece of data is written to the first recording location and second information indicating the number of times the piece of data has been read from the first recording location. Moreover, the device comprises a tracking unit for tracking access frequency with respect to each of the pieces of data using the first information and the second information. Furthermore, the device comprises a determining unit for determining recording positions of each of the pieces of data in the second recording location based on the tracked access frequency.

21 Claims, 14 Drawing Sheets

FIG. 6

| dm-id | Ram-count | Dm-count | Dm-readfreq |
|---|---|---|---|
| dm01 | 215 | 0 | ......11 00 10 00 |
| dm02 | 24 | 0 | ......00 00 00 00 |
| dm03 | 13 | 4 | ......00 00 01 10 |
| dm04 | 156 | 1 | ......00 11 00 01 |
| dm05 | 79 | 7 | ......00 00 01 11 |
| ⋮ | ⋮ | ⋮ | ⋮ |

FIG. 9
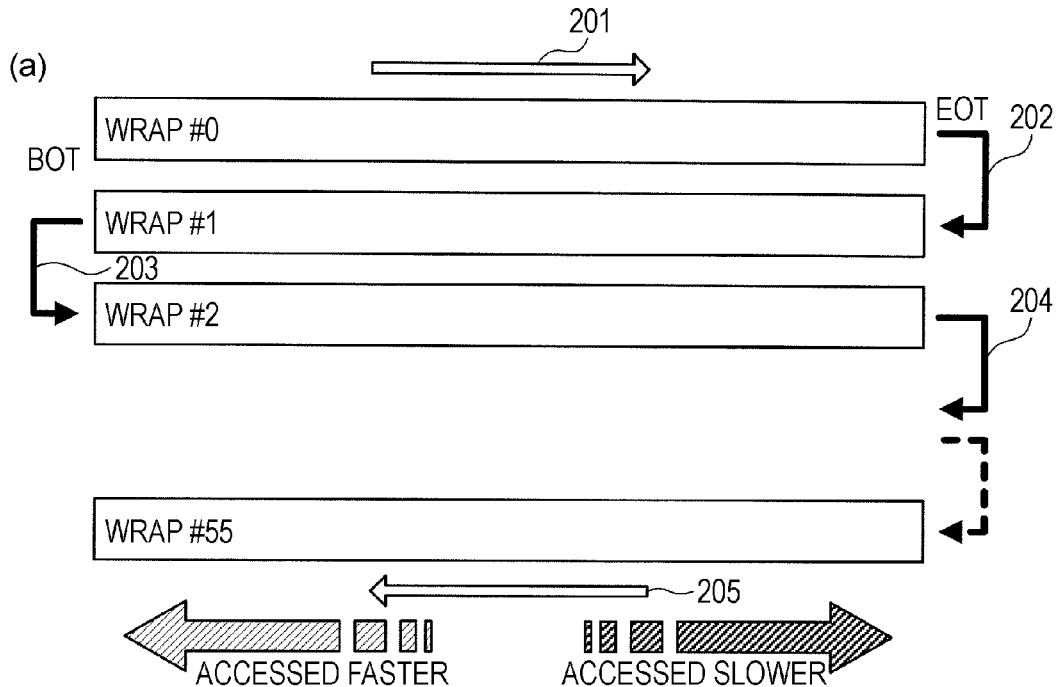
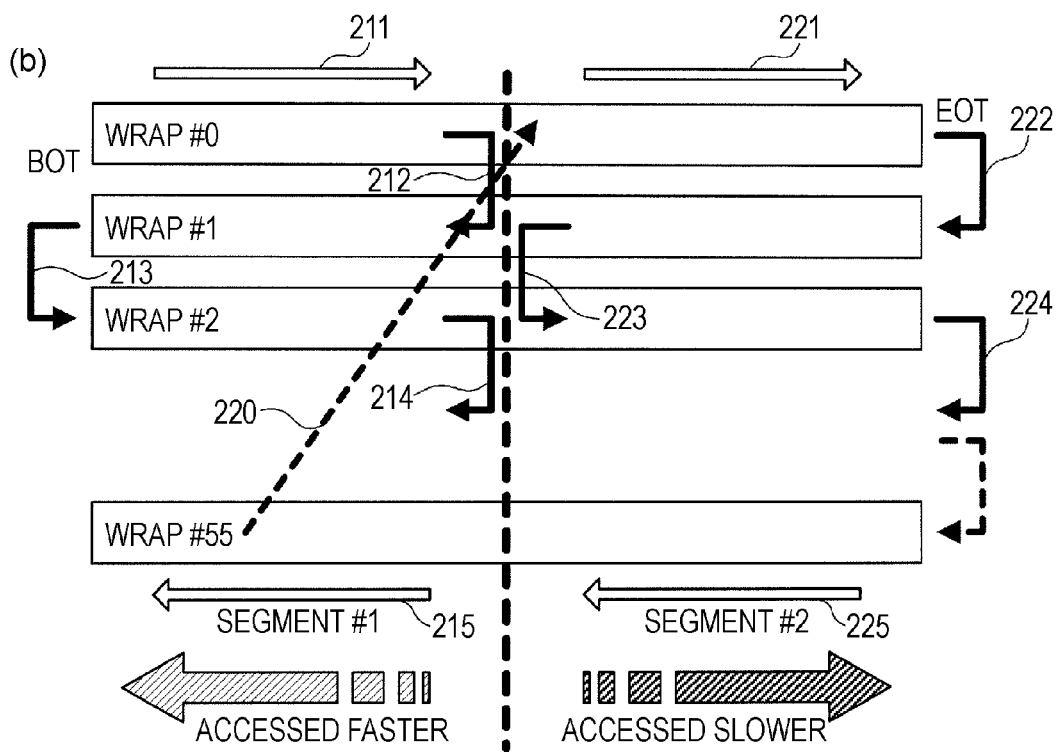

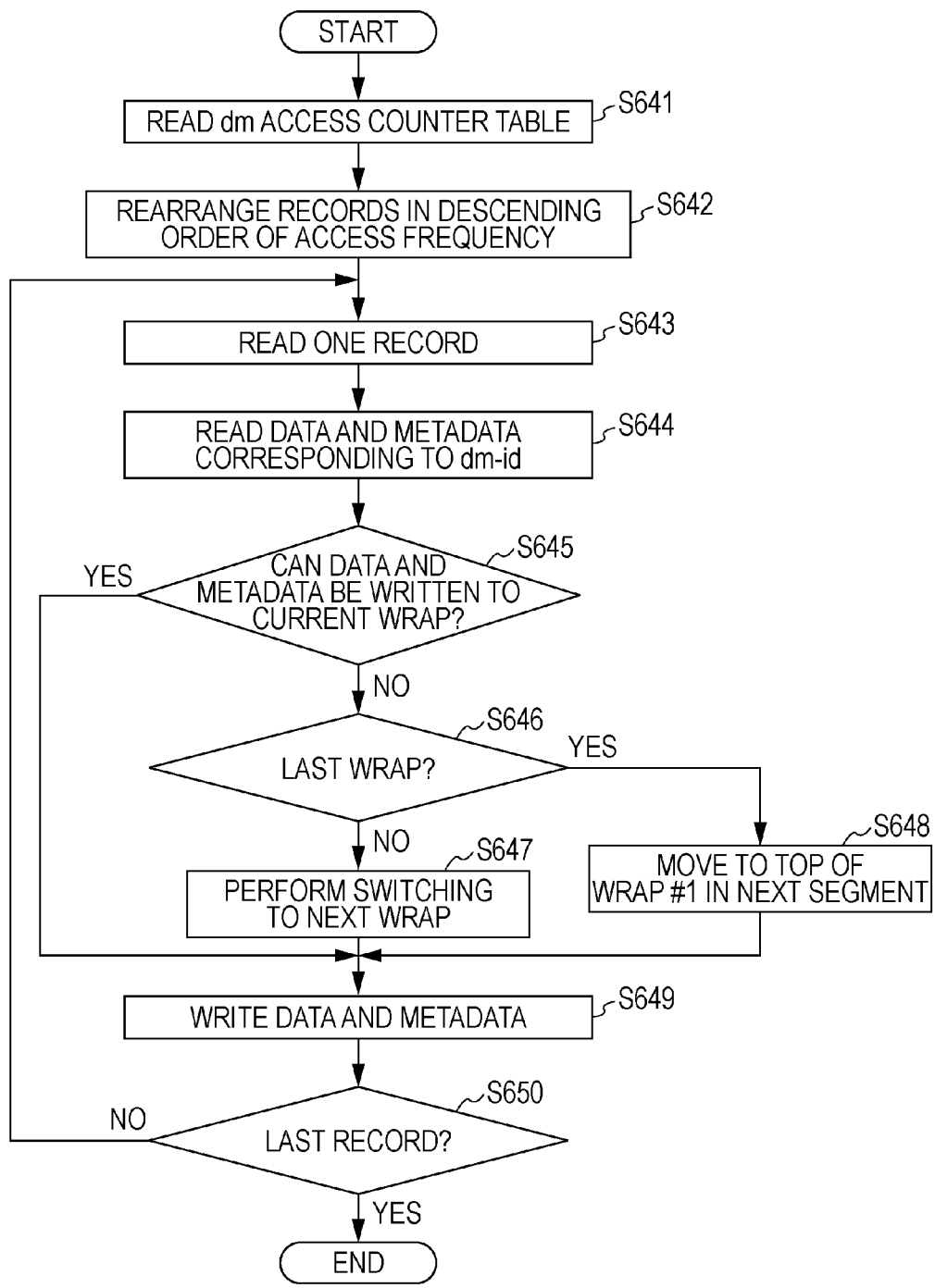

DEVICE, METHOD, AND COMPUTER PROGRAM PRODUCT FOR DATA MIGRATION

RELATED APPLICATION

This application is related to Japanese Patent Application No. 2008-329430 filed Dec. 25, 2008, the entire text of which is specifically incorporated by reference herein.

TECHNICAL FIELD

The various embodiments described herein relate to a device, method, and computer program product for migration of data recorded in a recording medium. In particular, the various embodiments relate to a device, method, and computer program product that support migration of data recorded in a recording medium to itself or to another recording medium.

BACKGROUND

Data migration may be necessary when a medium or a media drive device reaches the end of its life. Alternatively, data migration may be performed for operational reasons, such as for switching to a more cost-effective medium.

During data migration, it is desirable that frequently accessed data be recorded at a position advantageous in terms of performance. For example, when a plurality of pieces of data are accessed as a single data group, a piece of data recorded at a disadvantageous position in terms of performance may affect overall performance of access to the data group.

For migration of data recorded in one medium to itself (i.e., another region in the same medium) or to another medium, there are known techniques that improve performance by considering frequency of data access.

Japanese Unexamined Patent Application Publication No. 2007-164650 discloses a technique in which a rearrangement plan is created such that a frequently accessed logical volume is arranged in a RAID group in a long-time energization mode, a less frequently accessed logical volume is arranged in a RAID group in a first short-time energization mode, and a least frequently accessed logical volume is arranged in a RAID group in a second short-time energization mode. Then, execution of the rearrangement plan is determined based on access frequency to each RAID group.

Moreover, Japanese Unexamined Patent Application Publication No. 8-263335 discloses a technique in which access frequency to each file including a plurality of blocks is stored, a plurality of files related to each other and accessed with frequency not less than a predetermined value are extracted as a single group, data of each block in each of the extracted files is read from an optical disk, and the read pieces of data are sequentially written to consecutive or neighboring blocks on the optical disk.

Furthermore, Japanese Unexamined Patent Application Publication No. 11-31376 discloses a technique in which memory is provided in a cartridge in a tape cassette, and information about access frequency to each partition is recorded in the memory. To duplicate the tape, information about access frequency is read, and pieces of data are recorded in descending order of access frequency, starting at the beginning of the tape.

According to the aforementioned publications, the access frequency is recorded for a data group (e.g., logical volume, file, or partition) that includes a plurality of pieces of data. The data group may include data that has been present for a long time as well as data that has been created recently. For pieces of data that have been created at different times, real access frequency cannot be obtained when access frequency is determined with reference to the time axis. Therefore, the known techniques disclosed in the aforementioned publications are disadvantageous in that it is not possible to improve performance by considering real access frequency in data migration.

SUMMARY

Accordingly, an object of the various embodiments described herein is to improve performance by considering, in data migration, real access frequency without using the time axis. To achieve the object, the various embodiments provide a device for migrating pieces of data recorded in a first recording location to a second recording location. The device comprises an obtaining unit for obtaining, for each of the pieces of data, first information indicating the number of times any data has been read from the first recording location after the piece of data is written to the first recording location and second information indicating the number of times the piece of data is read from the first recording location. Moreover, the device comprises a tracking unit for tracking access frequency with respect to each of the pieces of data using the first information and the second information obtained by the obtaining unit. Furthermore, the device comprises a determining unit for determining a recording position of each of the pieces of data in the second recording location based on the access frequency tracked by the tracking unit.

The first recording location may be a first recording medium (e.g., a tape medium), and the second recording location may be a second recording medium. Alternatively, the first recording location may be a first region within a recording medium, and the second recording location may be a second region within the same recording medium.

The device further may comprise an updating unit for updating the first information and the second information corresponding to a piece of data when the piece of data has been read from the first recording location. Each of the pieces of data may comprise primary data and metadata. Metadata is additional information about the primary data. The updating unit may determine that a piece of data has been read when at least one of the primary data and the metadata of the piece of data has been read from the first recording location.

The device further may comprise a managing unit for reading each of the pieces of data from the first recording location and for writing each of the pieces of data to the second recording location at the recording positions determined by the determining unit.

The first information corresponding to a piece of data may indicate the number of times any data has been read from the first recording location after the piece of data is written to the first recording location by indicating the number of times a medium comprising the first recording location has been mounted in a storage unit after the piece of data is written to the first recording location.

In accordance with one method, the tracking unit may track the access frequency with respect to each of the pieces of data via a ratio of the number of times indicated by the second information to the number of times indicated by the first information. In accordance with another method, the tracking unit may track the access frequency for a piece of data only if the number of times indicated by the first information corresponding to the piece of data is within a predetermined range. Alternatively, the tracking unit may track the access frequency for a piece of data only with respect to data obtained when the number of times indicated by the first information corresponding to the piece of data is within a predetermined range.

The second information corresponding to a piece of data may comprise information indicating a read history with respect to the piece of data, the read history being represented by a plurality of bit values. The number of times any data has been read from the first recording location may be represented by M, and the number of times the piece of data has been read may be represented by N of the plurality of bit values, where N is less than M. That is to say, of M times any data has been read from the first recording location, the number of times the piece of data has been read may be represented by N, where N is less than M.

The determining unit may determine the recording positions of each of the pieces of data in the second recording location such that frequently accessed data is recorded at a first recording position in the second recording location and less frequently accessed data is recorded at a second recording position in the second recording location, the second recording position being a position at which the time required to read data from the second recording location is longer than that at the first recording position. In such case, the second recording location may be a tape medium from which data is read in a direction from a first end thereof to a second end thereof, and the second recording position may be closer to the second end than the first recording position is to the second end. Alternatively, the second recording location may be a tape medium from which data is read in a direction from a first end thereof to a second end thereof, the tape medium having a plurality of regions formed by dividing the tape medium at least one position in a longitudinal direction. In such case, the first recording position may be a position within a first region of the plurality of regions, and the second recording position may be a position within a second region of the plurality of regions, the second region being closer to the second end than the first region is to the second end.

The various embodiments described herein further provide a device that supports rearrangement of pieces of data in a recording medium (e.g., a tape medium). The device comprises an obtaining unit for obtaining, for each of the pieces of data, first information indicating the number of times any data has been read from the recording medium after the piece of data is written to the recording medium and second information indicating the number of times the piece of data has been read from the recording medium. Moreover, the device comprises a tracking unit for tracking access frequency with respect to each of the pieces of data using the first information and the second information obtained by the obtaining unit. Furthermore, the device comprises a determining unit for determining a recording position of each of the pieces of data in the recording medium on the basis of the access frequency tracked by the tracking unit.

The various embodiments further provide a device for migrating pieces of data recorded in a first recording location to a second recording location. The device comprises an obtaining unit for obtaining, for each of the pieces of data, first information indicating the number of times a medium comprising the first recording location has been mounted in a tape drive for reading any data after the piece of data is written to the first recording location and second information indicating the number of times the piece of data has been read from the first recording location. Moreover, the device comprises a tracking unit for tracking access frequency to each of the pieces of data via a ratio of the number of times indicated by the second information to the number of times indicated by the first information obtained by the obtaining unit. Furthermore, the device comprises a writing unit for writing the pieces of data to the second recording location in descending order of access frequency as tracked by the tracking unit.

Additionally, the various embodiments provide a method for migrating pieces of data recorded in a first recording location to a second recording location. The method comprises obtaining, for each of the pieces of data, first information indicating the number of times any data has been read from the first recording location after the piece of data is written to the first recording location and second information indicating the number of times the piece of data has been read from the first recording location. The method further comprises tracking access frequency with respect to each of the pieces of data using the first information and the second information and determining a recording position of each of the pieces of data in the second recording location based on the tracked access frequency.

Moreover, the various embodiments provide a computer program product for migrating pieces of data recorded in a first recording location to a second recording location. The computer program product comprises a computer-readable storage medium having computer-readable program code instructions stored therein. The computer-readable program code instructions comprise a first set of computer instructions for obtaining, for each of the pieces of data, first information indicating the number of times any data has been read from the first recording location after the piece of data is written to the first recording location and second information indicating the number of times the piece of data has been read from the first recording location. Moreover, the computer-readable program code instructions comprise a second set of computer instructions for tracking access frequency with respect to each of the pieces of data using the first information and the second information. Furthermore, the computer-readable program code instructions comprise a third set of instructions for determining a recording position of each of the pieces of data in the second recording location on the basis of the tracked access frequency.

In sum, the various embodiments described herein can improve performance by considering, in data migration, real access frequency without using the time axis.

BRIEF DESCRIPTION OF THE DRAWINGS

The various embodiments will now be described by way of example with reference to the accompanying drawings, in which:

FIG. 6 illustrates an example of a dm access counter table used in accordance with an exemplary embodiment;

FIG. 9(a) illustrates how data is read from or written to tape wraps based on the linear tape-open (LTO) standard;

FIG. 9(b) illustrates how data is read from or written to tape wraps using segmentation;

FIG. 14 is a flowchart illustrating data migration operations performed by the controller in accordance with an exemplary embodiment.

DETAILED DESCRIPTION

Hereinafter, the various embodiments will be described in detail with reference to the attached drawings. Although the various embodiments are applicable to any type of recording medium, a tape medium (hereinafter simply referred to as "tape") is used as an example. It is difficult to store a large amount of ever-increasing data entirely in a high-speed storage device, and thus it is important that pieces of data stored via a low-speed storage device, such as a tape drive, are arranged on the basis of access frequency.

Figure 1:
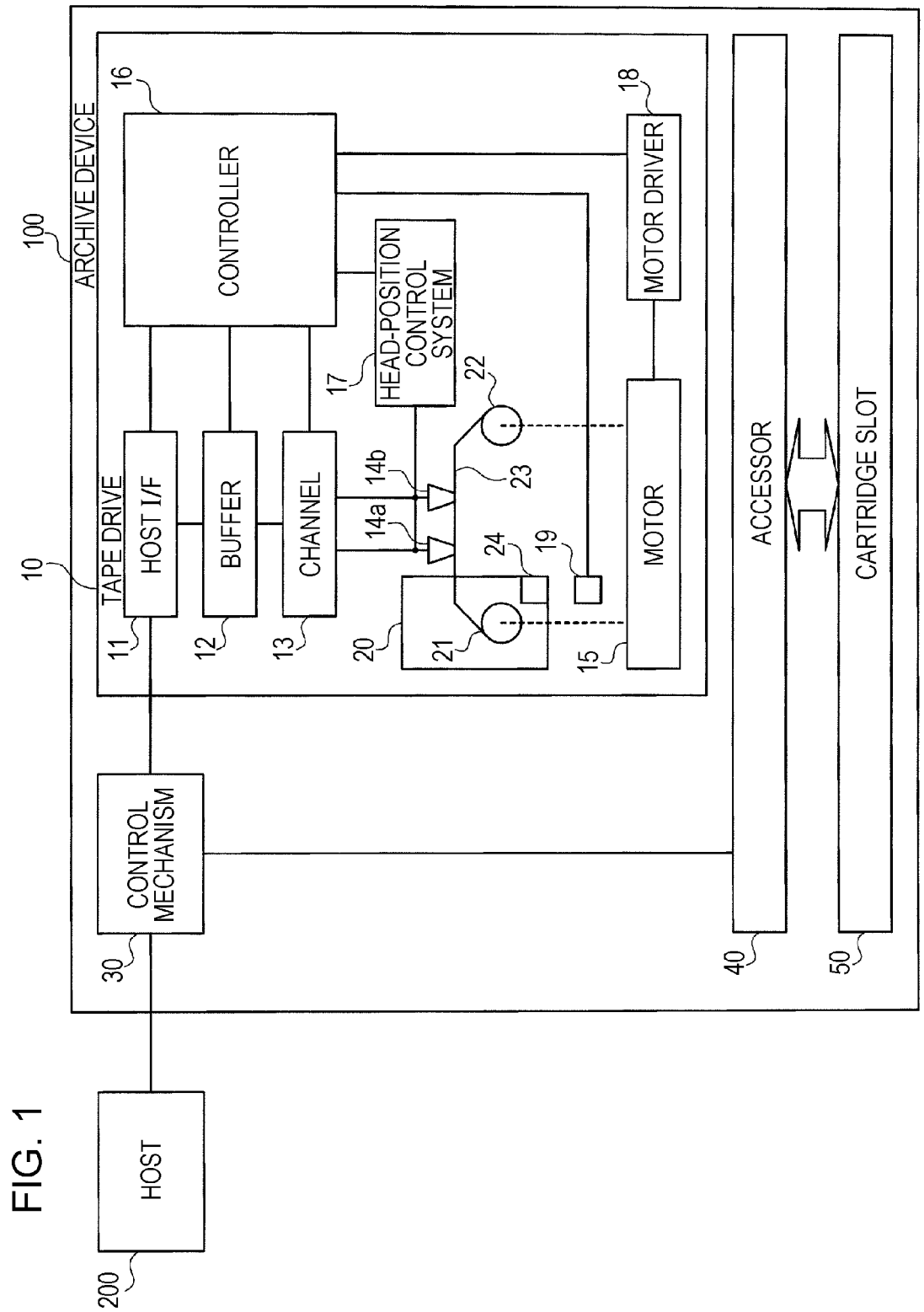
FIG. 1 is a block diagram illustrating a configuration of an archive device to which an exemplary embodiment is applied.

First, a digital data archive device (hereinafter referred to as an "archive device") to which an exemplary embodiment is applied will be described. FIG. 1 illustrates an exemplary configuration of an archive device 100 to which an exemplary embodiment is applied. The archive device 100 comprises a tape drive 10, a control mechanism 30, an accessor 40, and a cartridge slot 50.

The tape drive 10 comprises a host interface (hereinafter referred to as "host I/F") 11, a buffer 12, a channel 13, a write head 14a, a read head 14b, and a motor 15. The tape drive 10 further comprises a controller 16, a head-position control system 17, and a motor driver 18. A tape cartridge (hereinafter simply referred to as a "cartridge") 20, which can be inserted and loaded in the tape drive 10, is also illustrated in FIG. 1. The cartridge 20 comprises a tape 23 wound around reels 21 and 22. As the reels 21 and 22 rotate, the tape 23 moves longitudinally from the reel 21 to the reel 22, or from the reel 22 to the reel 21. Although a magnetic tape will be described as an example of the tape 23, the tape 23 may be a tape medium other than magnetic tape.

The cartridge 20 further comprises a cartridge memory 24. The cartridge memory 24 may record information about how data is written to the tape 23. High-speed access to data can be realized by checking (e.g., through an RF interface in a non-contact manner) an index of data written to the tape 23 and how the tape 23 is used. An interface, (such as the RF interface) that allows access to the cartridge memory 24 is illustrated in FIG. 1 as a cartridge memory interface (hereinafter referred to as "CM I/F") 19.

The host I/F 11 communicates with a host 200 via the control mechanism 30. For example, from the host 200, the host I/F 11 receives a command to write data to the tape 23 (first command), a command to move the tape 23 to a desired position (second command), and a command to read data from the tape 23 (third command). The host I/F 11 may use SCSI as a communication standard. In accordance with SCSI, the first command corresponds to a Write command, the second command corresponds to a Locate command or a Space command, and the third command corresponds to a Read command. The host I/F 11 returns to the host 200 a response indicating whether processing corresponding to one or more such commands has been successful.

The buffer 12 is a memory that stores data to be written to the tape 23 and data read from the tape 23. The buffer 12 may be a dynamic random access memory (DRAM). The buffer 12 has a plurality of buffer segments. Each of the buffer segments stores a data set, which is a unit of data read from and/or written to the tape 23. The channel 13 is a communication path through which data to be written to the tape 23 is transmitted to the write head 14a and through which data read from the tape 23 is received from the read head 14b. When the tape 23 moves in the longitudinal direction thereof, the write head 14a writes information to the tape 23, and the read head 14b reads information from the tape 23. The motor 15 rotates the reels 21 and 22. Although the motor 15 is represented by a single item in FIG. 1, two motors 15 may be provided for the respective reels 21 and 22.

The controller 16 controls overall operation of the tape drive 10. For example, in accordance with a command received by the host I/F 11, the controller 16 controls writing or reading of data to or from the tape 23. The controller 16 also controls the head-position control system 17 and the motor driver 18. The head-position control system 17 is a system that performs control such that the write head 14a and the read head 14b track one or more desired wraps. Here, the term "wrap" refers to a group of tracks on the tape 23. When a wrap switch is necessary, electrical switching must be performed between the write head 14a and the read head 14b. Such switching control is performed by the head-position control system 17. The motor driver 18 drives the motor 15. If two motors 15 are provided, two motor drivers 18 may be provided accordingly.

The control mechanism 30 is a mechanism that controls the accessor 40 and the tape drive 10 in accordance with an instruction from the host 200. The control mechanism 30 directs the accessor 40 to load the cartridge 20 in the tape drive 10 so that data specified by the host 200 can be read from or written to the cartridge 20. Also, the control mechanism 30 directs the tape drive 10 to read or write data specified by the host 200 from or to the cartridge 20 loaded by the accessor 40. Under the direction of the control mechanism 30, the accessor 40 takes the cartridge 20 out of the cartridge slot 50 and loads the cartridge 20 in the tape drive 10. The cartridge slot 50 stores the cartridge 20 on which no read or write operations are performed. Although the cartridge slot 50 is represented by a single item in FIG. 1, there may be a plurality of cartridge slots 50 for storing a plurality of cartridges.

Although only one tape drive 10 is shown in FIG. 1, there may be a plurality of tape drives 10. In such case, to direct the accessor 40 to load the cartridge 20 in one of the plurality of tape drives 10, the control mechanism 30 transmits identification information about the tape drive 10, which is a destination of a Read command or a Write command, to the accessor 40. Although FIG. 1 illustrates the tape drive 10 in which only one cartridge 20 is loaded, the tape drive 10 may accommodate a plurality of cartridges 20.

Performance with respect to access to data recorded on the tape 23 by the tape drive 10 varies significantly depending on the recording position on the tape 23. Therefore, if data is migrated to the tape 23 without consideration of data access frequency, the speed of access to frequently accessed data may be reduced. Consequently, performance with respect to access to data may be degraded.

The tape drive 10 may be used as an archive for photograph data, video data, etc. The stored data may comprise both primary data and metadata. Metadata serves as additional information about primary data and is becoming increasingly important as data to be stored for long periods of time in conjunction with primary data. For example, metadata for photograph data may provide information such as place and date and time at which the photograph was taken, photographer name, photographic equipment, recording format, file name, and file size. Metadata is closely associated with primary data and thus is often treated together with primary data. Therefore, when primary data is stored as archival data on the tape 23 and metadata for the data is stored on the same tape 23, access performance will be degraded unless both the primary data and the metadata are appropriately arranged.

Therefore, in accordance with an exemplary embodiment, access frequency with respect to pieces of data associated with each other and recorded on the tape 23 (including both primary data and metadata) is recorded and used to perform data migration. Thus, in data migration, an arrangement appropriate for performance of access to groups of primary data and metadata is realized.

Specifically, the following configuration is adopted. Primary data (hereinafter simply referred to as "data") and metadata are associated with each other via an identification value referred to herein as a dm-id. Each time the data or metadata is accessed, an access history is recorded in an access counter variable group (hereinafter referred to as a "counter group") corresponding to the appropriate dm-id. Due to characteristics of a tape, which is a sequential access recording medium, the access history is recorded in the counter group with reference to the number of times the tape 23 has been mounted for reading data, without reference to the time axis. For portability of the tape 23, the counter group is recorded in a semiconductor memory attached to the tape 23.

For data migration from a recording medium A to a recording medium B after the access history is recorded as described herein, the access frequency with respect to data and metadata associated with each other by dm-id in the recording medium A is calculated in accordance with a policy based on the counter group. Then, for improved access performance, pieces of data and metadata are rearranged on the recording medium B in descending order of access frequency. Note that the rearrangement method described here involves sequentially writing sets of associated data and metadata to the tape 23, starting from the beginning of the tape 23. Thus, access performance in reading the sets of data and metadata sequentially from the beginning of the tape 23 is improved.

Figure 2:
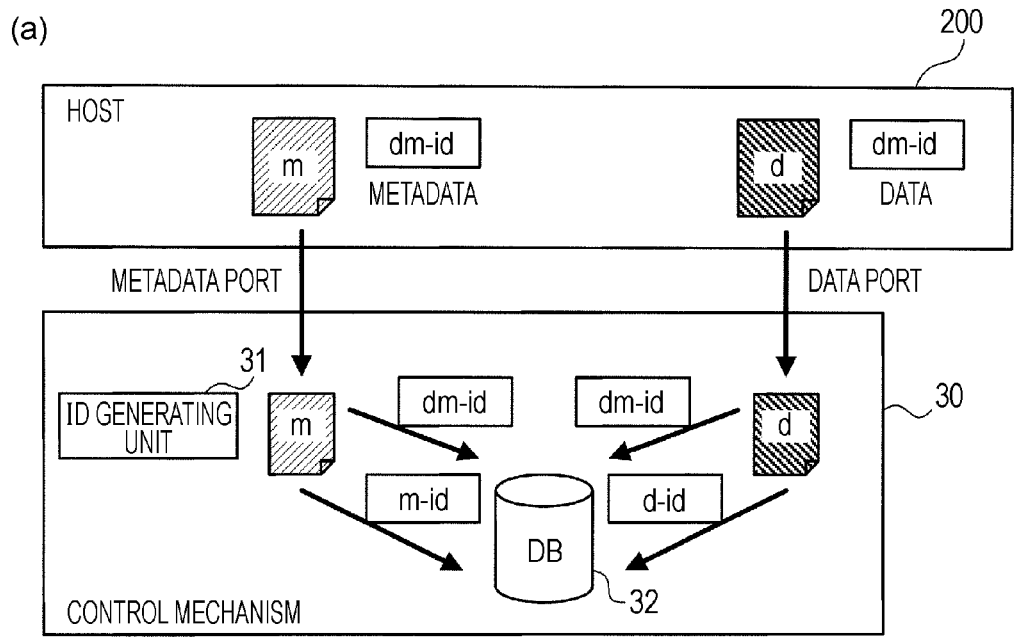
FIG. 2(a) to FIG. 2(c) are diagrams for explaining an association of dm-id, d-id, and m-id in accordance with an exemplary embodiment.

Hereinafter, a configuration for realizing the above operation will be described in detail. First, an association between data and metadata will be described. FIG. 2 schematically illustrates how data is associated with metadata. As illustrated in FIG. 2(a), the host 200 first creates an association between data and metadata by assigning a dm-id to the data and the metadata. Then, the host 200 passes the data through a data port to the control mechanism 30 and also passes the metadata through a metadata port to the control mechanism 30.

In the control mechanism 30, information passed through the data port is treated as data, to which an ID generating unit 31 generates and assigns a d-id. A d-id is an identification value for identifying the data and is a unique value at least in an environment where the archive device 100 operates. Also in the control mechanism 30, information passed through the metadata port is treated as metadata, to which the ID generating unit 31 generates and assigns a m-id. A m-id is an identification value for identifying the metadata and is a unique value at least in an environment where the archive device 100 operates. Although data and metadata are separately passed to the control mechanism 30, the relationship between the data and the metadata can be determined via the dm-id within the archive device 100.

The relationship between the data and the metadata, the relationship being based on dm-id, is recorded via a dm-a table (hereinafter referred to as "dm-a") in a database (DB) 32 by the control mechanism 30. FIG. 2(b) illustrates a format of dm-a. Although one piece of data is associated with one piece of metadata in the example of FIG. 2(b), the data and the metadata may be in the ratio of X to Y, where X and Y are natural numbers.

Additionally, recording positions of data and metadata in the archive device 100 are recorded, for each of the data and the metadata, via a dm-1 table (hereinafter simply referred to as "dm-1") by the control mechanism 30. FIG. 2(C) illustrates a format of dm-1. When a plurality of storage spaces are implemented in the archive device 100 and a plurality of copies of data or metadata are present in the plurality of storage spaces, entries corresponding to each of the copies are registered in dm-1. In FIG. 2(c), the entries are indicated by Location-1, Location-2, etc.

Figure 3:
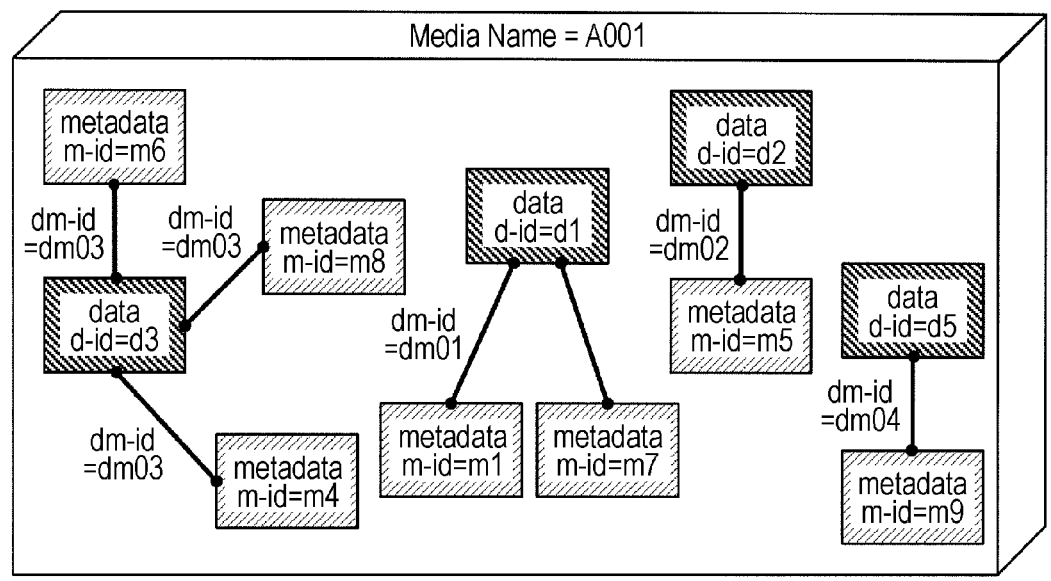
FIG. 3(a) and FIG. 3(b) illustrate associations of dm-id, d-id, and m-id in accordance with an exemplary embodiment.

Hereinafter, associations between data and metadata are described via an example. FIG. 3 illustrates exemplary associations between data and metadata. FIG. 3(a) illustrates a state in which data identified by d-id and metadata identified by m-id have a relationship identified by dm-id and are recorded in a recording medium having a media name "A001". Specifically, a piece of data identified by d-id "d3" and each of pieces of metadata identified by m-id "m4", m-id "m6", and m-id "m8" have a relationship identified by dm-id "dm03"; a piece of data identified by d-id "d1" and each of pieces of metadata identified by m-id "m1" and m-id "m7" have a relationship identified by dm-id "dm01"; a piece of data identified by d-id "d2" and a piece of metadata identified by m-id "m5" have a relationship identified by dm-id "dm02"; and a piece of data identified by d-id "d5" and a piece of metadata identified by m-id "m9" have a relationship identified by dm-id "dm04".

Hereinafter, a combination of data and metadata associated with each other by dm-id will be referred to as a "DM". FIG. 3(b) illustrates how identifiers (d-id and m-id) of a DM with dm-id "dm03" are listed in dm-a.

Since pieces of data and metadata are written to the tape 23 upon completion of preparation for writing, the order in which the pieces of data and metadata are recorded on the tape 23 is not uniquely determined. Therefore, even though a relationship between pieces of data and metadata is logically established by dm-id, recording positions of the pieces of data and metadata on the tape 23 may be physically scattered.

Figure 4:
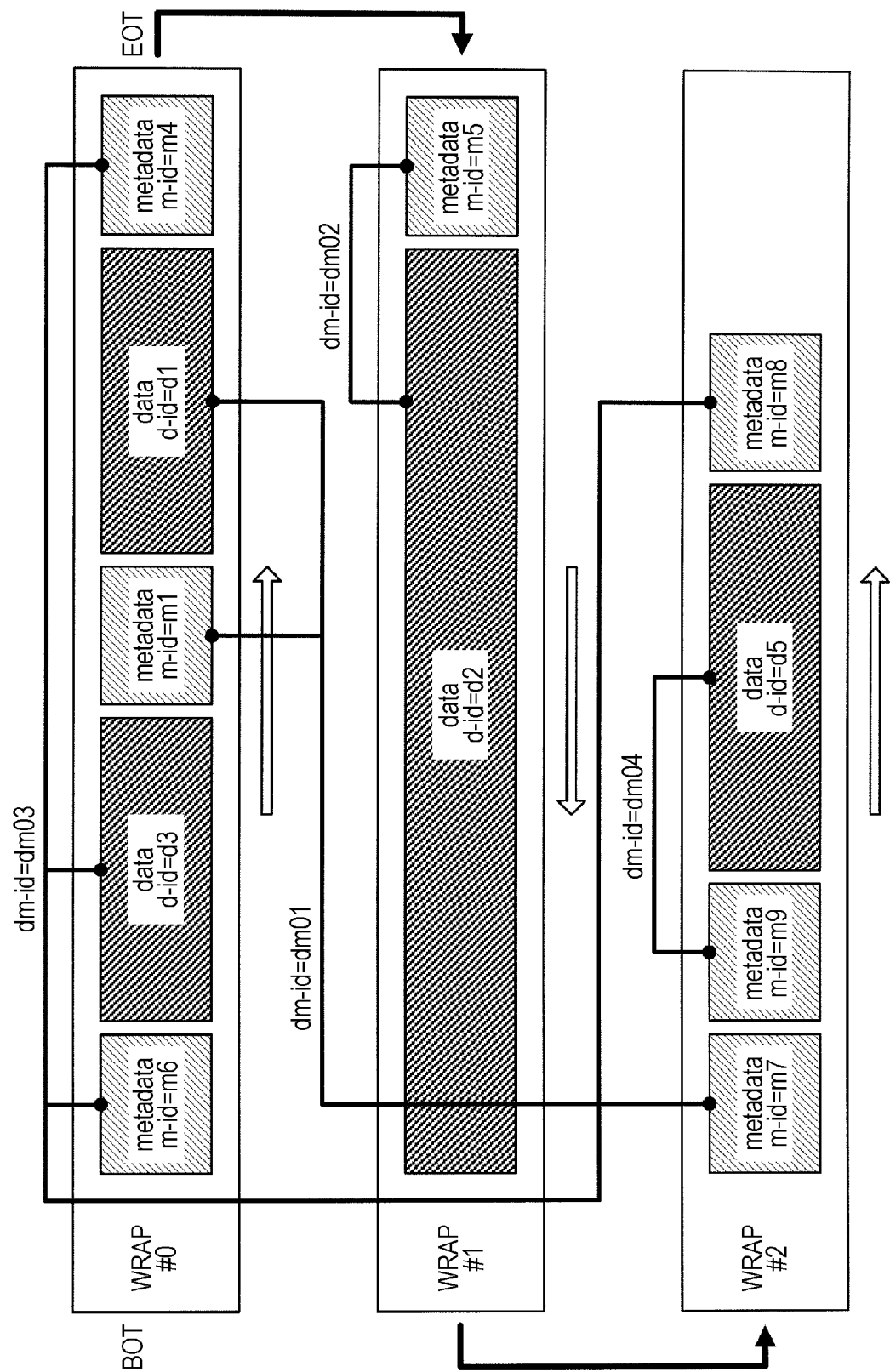
FIG. 4 illustrates a state in which pieces of data and metadata are arranged on a tape in a scattered manner before data migration.

FIG. 4 illustrates an example of pieces of data and metadata recorded on the tape 23 in a scattered manner before data migration. As illustrated, a plurality of wraps are present on the tape 23. In FIG. 4, each unshaded arrow indicates a direction in which data and metadata are written to the tape 23, while each black arrow indicates that a running direction of the tape 23 is reversed in accordance with a wrap turn. First, metadata with m-id "m6", data with d-id "d3", metadata with m-id "m1", data with d-id "d1", and metadata with m-id "m4" are written to wrap #0 in a forward direction. Next, metadata with m-id "m5" and data with d-id "d2" are written to wrap #1 in a reverse direction. Then, metadata with m-id "m7", metadata with m-id "m9", data with d-id "d5", and metadata with m-id "m8" are written to wrap #2 in the forward direction.

Even when groups of pieces of data and metadata such as those illustrated in FIG. 3(a) are stored in a given recording medium, if they are migrated to the tape 23, they may be arranged regardless of how data and metadata are associated with each other (i.e., they may be arranged in a scattered manner as illustrated in FIG. 4). However, since any DM having a given dm-id cannot be read unless positioning of the tape 23 is performed multiple times, access performance will be degraded if the data and metadata are not arranged in an orderly manner.

Thus, in accordance with an exemplary embodiment, when recorded data and metadata are migrated, they are rearranged on the basis of access frequency thereto. To facilitate such rearrangement, the following three counters are defined for each DM:

(1) Read Access Mount Counter (Ram-Count)

The Ram-count is a counter defined for each dm-id. The Ram-count holds the number of times the tape 23 has been mounted for data read purposes after data and metadata associated with each other by dm-id have been written to the tape 23. The various embodiments described herein are based on the assumption that every time it becomes necessary to read data from the tape 23, the tape 23 on which the data is recorded is mounted in the tape drive 10. Hereinafter, the act of mounting the tape 23 for read purposes will be referred to as a "read mount operation".

In accordance with the definition of the Ram-count described herein, the dm-id with the largest Ram-count value is the dm-id associated with data and metadata that were least recently written to the tape 23. The Ram-count assigned to each dm-id shows the relative age of the data and metadata on the tape 23 and also shows probability of access to the data and metadata for reading purposes. To prevent the Ram-count from wrapping around, the counter needs to be defined to hold a large value. If the counter wraps around, it is reset to zero.

(2) Read Frequency Counter (Dm-Readfreq)

The Dm-readfreq is a counter defined for each dm-id. The Dm-readfreq holds a history indicating to what extent data and metadata associated with each other by dm-id have been read during the read mount operations that have been performed (the number of read mount operations for the dm-id being indicated by the Ram-count). The Dm-readfreq is updated when either one of data and metadata is read.

For example, suppose that the maximum value of a Ram-count is 16, i.e., suppose that a Ram-count holds a history of the past 16 read mount operations. In such case, if each bit of the Dm-readfreq represents whether data or metadata with the corresponding dm-id has been read during a particular read mount operation, then Dm-readfreq is represented by 16 bits. However, if one bit is assigned to one read mount operation, memory space may become an issue. In another example, suppose that it is desired to measure access frequency from a history of the past 256 read mount operations. In such case, the maximum value of a Ram-count is 256, and it is necessary to prepare a 32-byte (256-bit) memory area if one bit is assigned to one read mount operation. Thus, to save memory space, methods will be described for representing a plurality of read mount operations by a smaller number of bits.

One such method involves representing eight read mount operations with one bit. Using such method, a memory area of only four bytes (=256 bits/8=32 bits) is required. This method involves using not only a Dm-readfreq but also a dm access counter (i.e., "Dm-count") (described further herein). The Dm-count holds the number of times that data or metadata with the corresponding dm-id has been read during the past eight read mount operations, while the Dm-readfreq holds a history of read access extending beyond the past eight read mount operations. However, the Dm-readfreq bit value in accordance with this method lacks precision. For example, if the Dm-readfreq indicates one in accordance with this method, it is unknown from the Dm-readfreq whether data or metadata with the corresponding dm-id has been read once or eight times in the past eight read mount operations.

Another method is provided that enables representing a plurality of read mount operations by a plurality of bits (rather than just one bit). For example, when eight read mount operations are represented by two bits, a memory area of eight bytes (=256 bits/8×2=32 bits×2) is required. This method also involves using not only the Dm-readfreq but also the Dm-count (described further herein). As previously mentioned, the Dm-count holds a value corresponding to the number of times that data or metadata with the corresponding dm-id has been read during the past eight read mount operations, while the Dm-readfreq holds a history of read access extending beyond the past eight read mount operations. Access frequency in accordance with this method may be represented in the Dm-readfreq by two bits as follows:

"00": no access
"01": one to two times
"10": three to five times
"11": six to eight times These definitions may be changed depending on the policy of frequency calculation.

(3) Dm Access Counter (Dm-Count)

The Dm-count is a counter that holds the number of times a DM with a given dm-id has been read out of M read mount operations that are represented by N bits as one unit in the Dm-readfreq, N being less than M. For example, when the past eight read mount operations are grouped together as one unit, if data or metadata with the corresponding dm-id has been read during each of the past eight read mount operations, the Dm-count indicates eight. If data or metadata with the corresponding dm-id has been read twice during the past eight read mount operations, the Dm-count indicates two. After one unit of read mount operations, such as eight read mount operations of the tape 23, the Dm-count is reset to zero, and the history of the past eight read mount operations is preserved in the Dm-readfreq. For purposes of this description, the Ram-count is used to count eight read mount operations grouped together as one unit, and thus the Dm-count is reset to zero after the number of read mount operations reaches a multiple of eight.

Through use of the above-described three counters, the following information can be obtained:

1. frequency of reading the DM with target dm-id in the past X read mount operations of the tape 23;
2. the number of times the DM with target dm-id has been read;
3. access probability calculated on the basis of the number of times the DM with target dm-id has been read in the past X read mount operations of the tape 23; and
4. access tendency in X read mount operations, i.e., whether data has been frequently accessed recently or was frequently accessed in the past.

Typically, data access frequency is determined with reference to the time axis. However, when a removable recording medium such as a tape is ejected from a recording device or there is no access to the tape in the recording device, in a sense "time is stopped". Therefore, in accordance with an exemplary embodiment, instead of taking the time axis into consideration, data access frequency is determined on the basis of the number of times the tape has been mounted for data read purposes.

Factors that define the sizes of the above-described three counters are as follows:
1. the number of past read mount operations to be targeted; and
2. the number of bits used to represent a number of read mount operations.

For example, as described herein, when the past 256 read mount operations are used as a target to measure access frequency, the Ram-count is represented by one byte. When eight read mount operations are grouped together as one unit and are represented by two bits, the Dm-readfreq is represented by eight bytes, and the Dm-count is represented by four bits.

Figure 5:
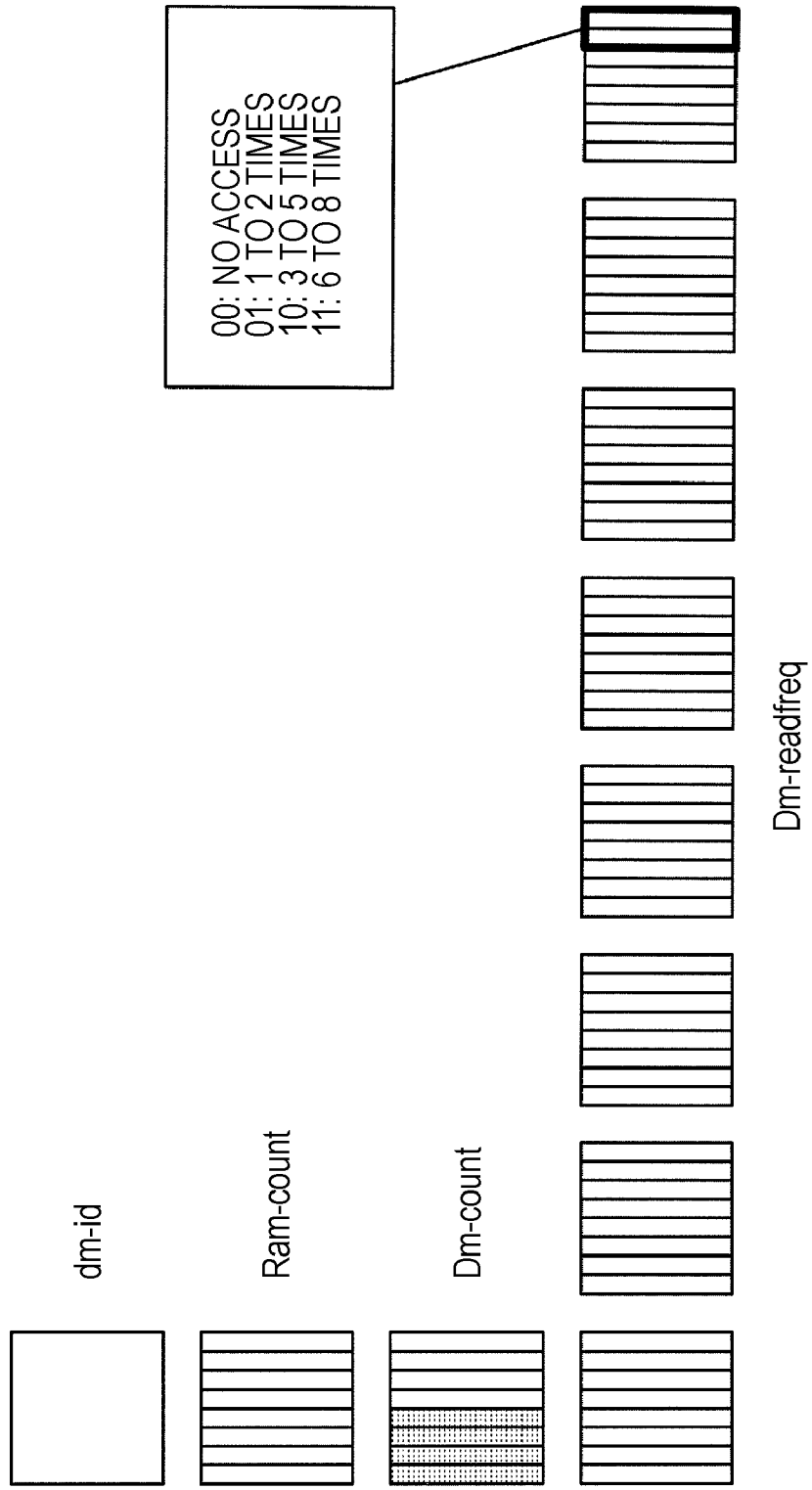
FIG. 5 is a diagram for explaining counters used in accordance with an exemplary embodiment.

FIG. 5 illustrates the above-described three counters. Since the three counters are provided for each dm-id, a given dm-id is also illustrated in FIG. 5. Note that since the number of bits assigned to the dm-id is not specified above, the dm-id is simply represented by one rectangle. Since the number of bits assigned to each of the three counters is specified, for the three counters one bit is associated with and represented by one narrow rectangle. Specifically, the Ram-count, which requires an eight-bit memory area, is represented by eight narrow rectangles. The Dm-count, which requires a four-bit memory area, is represented by four narrow rectangles, which are expressed by shading four of eight narrow rectangles (the shading indicates that four bits represented by the other four narrow rectangles are unused). The Dm-readfreq, which requires a 64-bit memory area, is represented by 64 narrow rectangles. In the Dm-readfreq, eight read mount operations are grouped together as one unit and represented by two bits. FIG. 5 depicts the aforementioned exemplary two-bit representations at the right end of the Dm-readfreq.

The values of the three counters are stored for each dm-id in a dm access counter table. FIG. 6 illustrates an example of a dm access counter table. In FIG. 6, a Ram-count column shows that 215 read mount operations have been performed after the DM with dm-id "dm01" was written, 24 read mount operations have been performed after the DM with dm-id "dm02" was written, 13 read mount operations have been performed after the DM with dm-id "dm03" was written, 156 read mount operations have been performed after the DM with dm-id "dm04" was written, and 79 read mount operations have been performed after the DM with dm-id "dm05" was written.

Also in FIG. 6, a Dm-count column shows that the DM with dm-id "dm01" and the DM with dm-id "dm02" have not been read in the past eight read mount operations, the DM with dm-id "dm03" has been read four times in the past eight read mount operations, the DM with dm-id "dm04" has been read once in the past eight read mount operations, and the DM with dm-id "dm05" has been read seven times in the past eight read mount operations. The number of times described herein is reflected in two bits at the right end of the Dm-readfreq for each dm-id.

In a Dm-readfreq column of FIG. 6, the number of DM reads is represented by eight bits. As the number of times that a given DM has been read in eight read mount operations is represented by two bits, the number of times that a given DM has been read in the past 32 read mount operations is explicitly shown in FIG. 6. A series of dots " . . . " to the left of each bit string represent bit values corresponding to earlier read mount operations (omitted for simplicity purposes). As for the dm-id "dm02" for which the Ram-count indicates 24, six bits are sufficient for representing the Dm-readfreq. Similarly, as for dm-id "dm03" for which the Ram-count indicates 13, four bits are sufficient for representing the Dm-readfreq. In both of these cases, however, the Dm-readfreq is represented by eight bits, filled with zeros on the left as appropriate.

Figure 7:
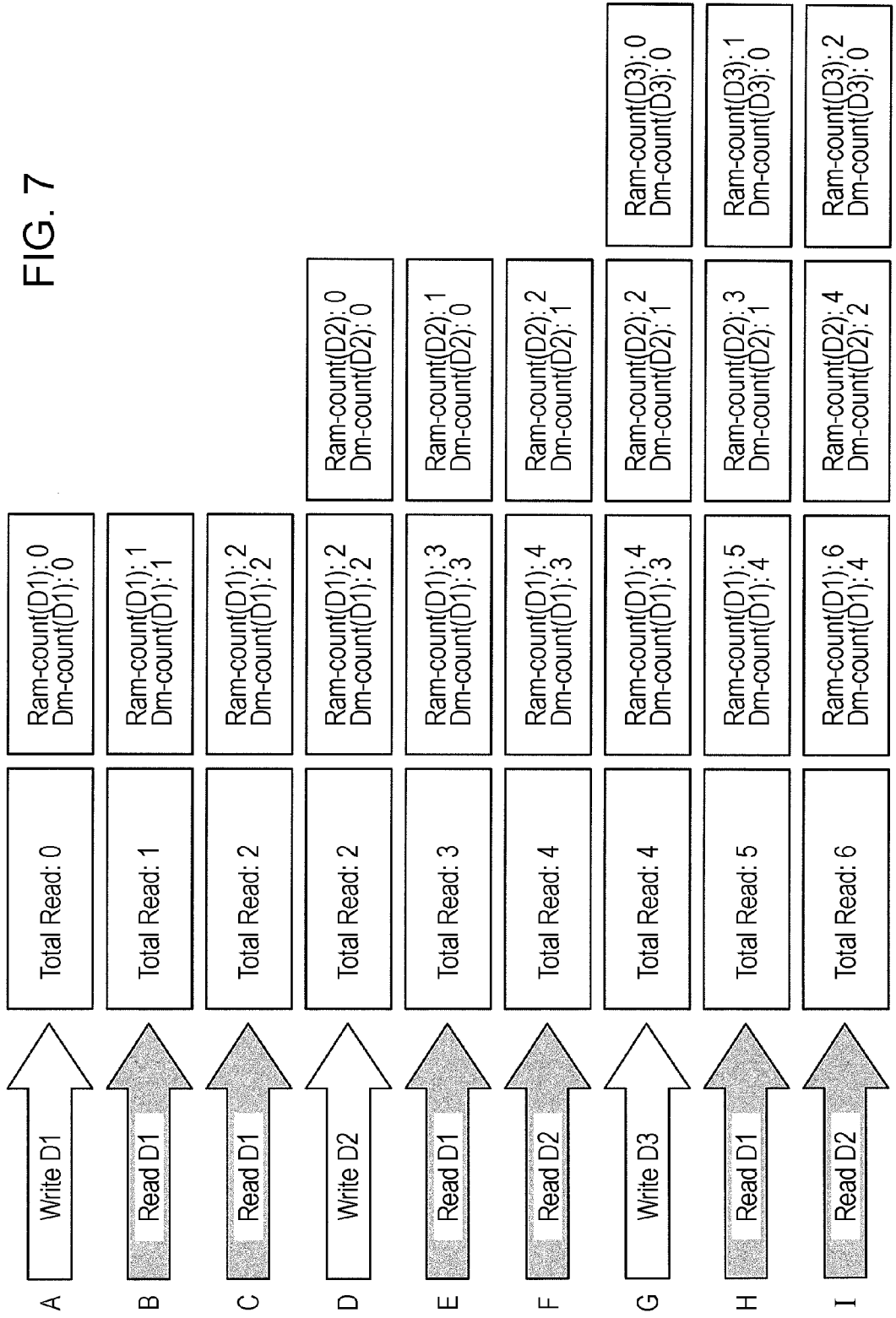
FIG. 7 is a diagram for explaining counter updates in accordance with an exemplary embodiment.

Next, the process of updating the three counters will be described with reference to an example. FIG. 7 illustrates how each counter stored in the cartridge 20 is updated when the tape drive 10 receives a Write command or a Read command. While not mentioned in the above description, a Total Read counter is also illustrated in FIG. 7. A Total Read counter is a counter for each tape 23, not for each dm-id, and is updated when the tape 23 is mounted for read purposes. In FIG. 7, the Dm-readfreq is omitted. In FIG. 7, D1 to D3 each indicate data, which is a generalized representation of DM.

As illustrated in A of FIG. 7, when a Write command for D1 is received, the Total Read counter indicates zero. A Ram-count and a Dm-count for D1 are created with their values initialized to zero. Next, as illustrated in B of FIG. 7, when a Read command for D1 is received, the Total Read counter value is updated to one, and additionally the Ram-count and the Dm-count values for D1 are updated to one. Next, as illustrated in C of FIG. 7, when a Read command for D1 is received, the Total Read counter value is updated to two, and additionally the Ram-count and the Dm-count values for D1 are updated to two.

As illustrated in D of FIG. 7, when a Write command for D2 is received, the Total Read counter value remains at two. The Ram-count and the Dm-count values for D1 also remain at two. A Ram-count and a Dm-count for D2 are created with their values initialized to zero. Next, as illustrated in E of FIG. 7, when a Read command for D1 is received, the Total Read counter value is updated to three. Moreover, the Ram-count value for D1 is updated to three. Furthermore, the Dm-count value for D1 is updated to three, because D1 has been read. On the other hand, while the Ram-count value for D2 is updated to one, the Dm-count value for D2 remains at zero, because D2 has not been read. Next, as illustrated in F of FIG. 7, when a Read command for D2 is received, the Total Read counter value is updated to four. While the Ram-count value for D1 is updated to four, the Dm-count value for D1 remains at three, because D1 has not been read. On the other hand, the Ram-count value for D2 is updated to two, and the Dm-count value for D2 is updated to one, because D2 has been read.

Subsequently, when a Write command and a Read command are received as illustrated in G, H, and I of FIG. 7, the Ram-count and the Dm-count values for each of D1, D2, and D3 as well as the Total Read counter value are updated in the same manner as described herein.

Next, in accordance with the various embodiments described herein, a description is provided regarding rearrangement performed on the basis of access frequency when data and metadata are migrated. When data and metadata on the tape 23 are migrated to another tape (or to a different location on the tape 23), the data and metadata corresponding to a given dm-id are recorded at positions advantageous in terms of access performance, in descending order of access frequency. Access frequency can be determined using data from a dm access counter table such as the one illustrated in FIG. 6.

The most basic method for determining access frequency is to calculate Dm-readfreq point value/Total Read counter value (hereinafter, this determining method is referred to as "basic method"). Determination of the Dm-readfreq point value in accordance with an exemplary embodiment is described herein. The basic method is disadvantageous with respect to determining access frequency because the result varies depending on when a DM was written to the tape 23. For example, using the basic method, a DM first written to the tape 23 cannot be reliably compared with a DM written to the tape 23 after the Ram-count value reaches 100. Accordingly, improved methods for determining access frequency are provided in accordance with the various embodiments described herein.

First Determining Method

A first determining method in accordance with an exemplary embodiment is a method for determining relative access frequency to a DM by calculating Dm-readfreq point value/Ram-count value. Since the first determining method factors in the Ram-count value for a DM instead of the Total Read counter value, the first determining method addresses the shortcomings of the basic method by taking into account when a DM was written to the tape 23.

Calculations using both the basic method and the first determining method now will be described with reference to the example illustrated in FIG. 6. It is assumed here that zeros are present as bit values in the omitted portion " . . . " of the Dm-readfreq for each DM. Thus, it is assumed here that the Dm-readfreq point value is determined based on the last thirty-two read accesses, which are represented by the four two-bit pairs provided for each DM. As previously discussed herein and illustrated in FIG. 5, each of the two-bit pairs in the Dm-readfreq may correspond to ranges indicating the number of read accesses during eight read mount operations. In accordance with an exemplary embodiment, the Dm-readfreq point value for calculating the access frequency for each DM may be determined by obtaining the sum of the decimal equivalents of each of the four two-bit pairs in the Dm-readfreq. Such sum is an appropriate approximation that permits a precise value to be obtained for each DM from the ranges indicated by the two-bit pairs in the Dm-readfreq. Thus, with respect to the DM with "dm01", which as illustrated in FIG. 6 has the Dm-readfreq bit combination "11 00 10 00", the Dm-readfreq point value for purposes of calculating access frequency may be determined by the sum 3+0+2+0=5. Similarly, with respect to the DM with "dm05", which as illustrated in FIG. 6 has the Dm-readfreq bit combination "00 00 01 11", the Dm-readfreq point value for purposes of calculating access frequency may be determined by the sum 0+0+1+3=4.

Accordingly, when the basic method is used and the Total Read counter indicates 250, access frequency to the DM with "dm01" is 0.02 (=5/250), access frequency to the DM with "dm02" is 0 (=0/250), access frequency to the DM with "dm03" is 0.012 (=3/250), access frequency to the DM with "dm04" is 0.016 (=4/250), and access frequency to the DM with "dm05" is 0.016 (=4/250). Thus, the descending order of access frequency according to the basic method is dm01, dm05, dm04, dm03, and dm02. Note that if the resulting values are the same (as is the case here with "dm04" and "dm05"), the DM that is accessed more recently is determined to be the more frequently accessed DM.

On the other hand, when the first determining method is used instead of the basic method, access frequency to the DM with "dm01" is 0.023 (=5/215), access frequency to the DM with "dm02" is 0 (=0/24), access frequency to the DM with "dm03" is 0.231 (=3/13), access frequency to the DM with "dm04" is 0.026 (=4/156), and access frequency to the DM with "dm05" is 0.051 (=4/79). Thus, the descending order of access frequency according to the first determining method is dm03, dm05, dm04, dm01, and dm02. This order differs from the order obtained by the basic method.

Second Determining Method

A second determining method in accordance with an exemplary embodiment is a method in which the Ram-count value held for each DM is used as a criterion for selecting the DMs for which access frequency is to be calculated. For example, a recently written DM may be removed from those for which access frequency is to be calculated. That is to say, access frequency may be calculated for a DM only if the DM has a Ram-count value within a predetermined range. Specifically, for example, a DM with a Ram-count value that is three or less may be removed.

Alternatively, it may be desired to measure how frequently a DM was accessed during a specific period of time, such as from the past x-th to y-th read mount operations. That is to say, access frequency may be calculated for a DM only with respect to data obtained when the Ram-count value is within a predetermined range. For example, it may be assumed that access frequency is to be calculated only with respect to data obtained with Ram-count values in the 70 to 100 range. In such case, the number of times each DM was accessed in the period from the 70th read mount operation to the 100th read mount operation is calculated from the Dm-readfreq. The resulting values are compared so that the corresponding DMs are arranged in descending order of access frequency. The Ram-count range taken into consideration in accordance with the second determining method described herein is an example of a predetermined range for limiting the targets for which access frequency is to be calculated.

Figure 8:
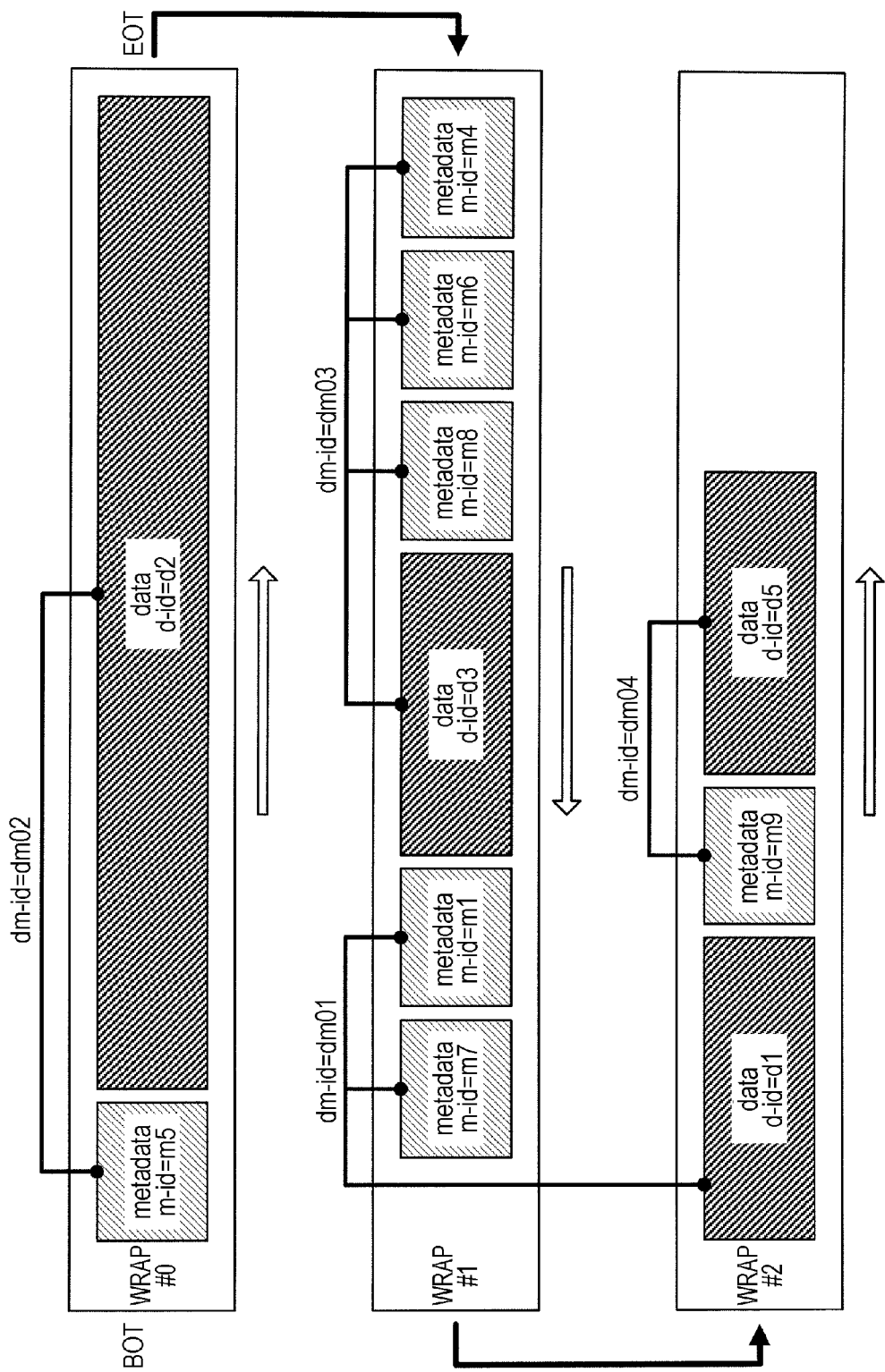
FIG. 8 illustrates an arrangement of data and metadata on a tape in descending order of access frequency after data migration in accordance with an exemplary embodiment.

When access frequency is calculated as described above, the tape drive 10 migrates data from one tape to another on the basis of access frequency. FIG. 8 illustrates an arrangement of data and metadata on the tape 23 after data migration in accordance with an exemplary embodiment. As in the case with FIG. 4, a plurality of wraps are present on the tape 23. Again, each unshaded arrow indicates a direction in which data and metadata are written to the tape 23, while each black arrow indicates that a running direction of the tape 23 is reversed. For purposes of this example, the descending order of access frequency is assumed to be as follows: dm02, dm03, dm01, and dm04. Accordingly, metadata and data of DM with dm-id "dm02" are written sequentially to wrap #0 in a forward direction. Next, after a wrap turn metadata and data of DM with dm-id "dm03" are written sequentially to wrap #1 in a reverse direction. Next, metadata of DM with dm-id "dm01" is written to wrap #1 in the reverse direction. Next, after another wrap turn, data of DM with dm-id "dm01" is written to wrap #2 in the forward direction. Subsequently, metadata and data of DM with dm-id "dm04" are written sequentially to wrap #2 in the forward direction. In sum, after data migration based on access frequency, unlike in the case of FIG. 4, data and metadata are recorded on the basis of logical associations as illustrated in FIG. 3. Therefore, when associated data and metadata are sequentially read from the tape 23, there is no need to perform unnecessary positioning of the tape 23, and thus improved access performance can be achieved.

In accordance with the data migration technique described above, data and metadata are arranged based on access frequency calculated in accordance with an exemplary embodiment. Therefore, the time required to access frequently accessed data and metadata can be reduced. Moreover, since data and metadata arranged in a scattered manner on the tape 23 before migration are rearranged in accordance with a certain rule (sequentially) in accordance with an exemplary embodiment, improved performance in accessing data and metadata can be achieved.

As a method for implementing hierarchical storage for storing a large amount of data, an archive system for storing digital data may adopt a method that uses the tape 23 as secondary or tertiary storage. This is based on the assumption that there will be archived but frequently accessed data that is actually accessed. The various embodiments described herein contribute to improved performance with respect to access to such data.

In the exemplary arrangement described herein, data and metadata arranged in a scattered manner on the tape 23 serving as a migration source (hereinafter referred to as "source tape") are grouped together with respect to each dm-id and sequentially stored on the tape 23 serving as a migration destination (hereinafter referred to as "destination tape"). However, the possible arrangement methods on the destination tape are not limited to this exemplary arrangement method. Note that references to the tape 23 herein may refer to the source tape and/or the destination tape.

Another arrangement method now will be described. In accordance with the arrangement method to be described, data is rearranged on the tape 23 in view of characteristics of a tape medium. Specifically, in accordance with the arrangement method, frequently accessed data is arranged at a position readily accessible after the tape 23 is mounted.

A tape storage device performs the following operations in preparation for reading data:
1. mounting a cartridge in the storage device; and
2. adjusting the beginning of the tape 23 to the position of a head of the storage device, the beginning being a position at which data to be read is stored.

That is, immediately after mounting the cartridge, the head of the storage device is positioned at the beginning of the tape 23. Therefore, the speed of access to data located near the beginning of the tape 23 is faster than the speed of access to data located near the end of the tape 23, because when data is recorded near the end of the tape 23, it is necessary to move the tape 23 and perform positioning of the tape 23.

FIG. 9(a) illustrates normal reading and writing of data from and to the tape 23 based on the linear tape-open (LTO) standard. First, after reading or writing data from or to wrap #0 rightward as indicated by an arrow 201, the running direction of the tape 23 is reversed as indicated by an arrow 202. Next, after reading or writing data from or to wrap #1 leftward, the running direction of the tape 23 is reversed as indicated by an arrow 203. Then, after reading or writing data from or to wrap #2 rightward, the running direction of the tape 23 is reversed as indicated by an arrow 204. Lastly, after further data reads/writes not explicitly shown in FIG. 9(a), data is read from or written to wrap #55 leftward as indicated by an arrow 205.

Thus, in accordance with the LTO format, the head of the storage device reads or writes data from or to the tape 23 while reciprocating, from the beginning to the end of the tape 23, over a plurality of wraps defined on the tape 23. When pieces of data are sequentially read from or written to the tape 23, the head reciprocates over the wraps, as described herein. However, a mechanical operation in which the head is moved across the width of the tape 23 for switching from one wrap to another completes in a short time. Therefore, even in the LTO format, data located near the beginning of the tape 23 can be accessed more quickly than data located near the end of the tape 23. Thus, it is preferable that frequently accessed data be arranged near the beginning of the tape 23 and less frequently accessed data be arranged near the end of the tape 23. Here, the beginning of the tape 23 is an example of a first end, while the end of the tape 23 is an example of a second end.

Some tape storage devices implement segmentation. Segmentation is a method of dividing a tape into a plurality of segments and sequentially writing data to the tape, starting from the first segment. Here, the segments are exemplary regions formed by dividing the tape 23 at least one position in the longitudinal direction. FIG. 9(b) illustrates reading and writing data using segmentation. First, after reading or writing data from or to segment #1 of wrap #0 rightward as indicated by an arrow 211, the running direction of the tape 23 is reversed as indicated by an arrow 212. Next, after reading or writing data from or to segment #1 of wrap #1 leftward, the running direction of the tape 23 is reversed as indicated by an arrow 213. Next, after reading or writing data from or to segment #1 of wrap #2 rightward, the running direction of the tape 23 is reversed as indicated by an arrow 214. Then, after further data reads/writes not explicitly shown in FIG. 9(b), data is read from or written to segment #1 of wrap #55 leftward as indicated by an arrow 215.

Subsequently, as indicated by an arrow 220, the head position is moved to segment #2 of wrap #0. Then, after reading or writing data from or to segment #2 of wrap #0 rightward as indicated by an arrow 221, the running direction of the tape 23 is reversed as indicated by an arrow 222. Next, after reading or writing data from or to segment #2 of wrap #1 leftward, the running direction of the tape 23 is reversed as indicated by an arrow 223. Then, after reading or writing data from or to segment #2 of wrap #2 rightward, the running direction of the tape 23 is reversed as indicated by an arrow 224. Lastly, after further data reads/writes not explicitly shown in FIG. 9(b), data is read from or written to segment #2 of wrap #55 leftward, as indicated by an arrow 225.

As described herein, the speed of access to segment #1 is faster than the speed of access to segment #2. When there are three or more segments, the access speed to a segment closer to the beginning of the tape 23 is generally faster than the access speed to a segment closer to the end of the tape 23. Therefore, when data is migrated to the tape 23 as described above, it is preferable that frequently accessed data and metadata be arranged in a segment closer to the beginning of the tape 23 and that less frequently accessed data and metadata be arranged in a segment closer to the end of the tape 23. Here, a segment closer to the beginning of the tape 23 is an example of the first end, while a segment closer to the end of the tape 23 is an example of the second end.

Figure 10:
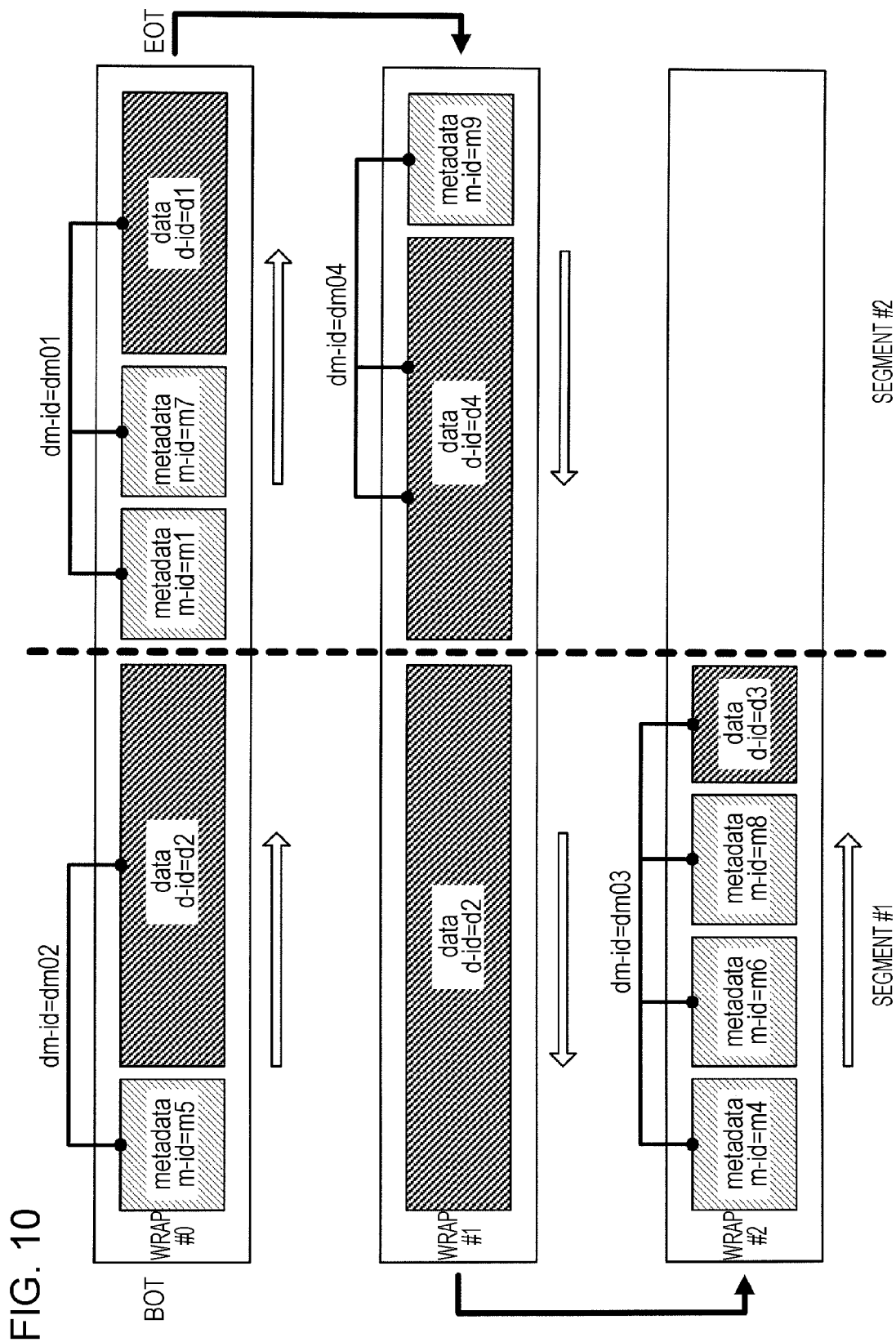
FIG. 10 illustrates an arrangement of data and metadata on a segmented tape in descending order of access frequency after data migration in accordance with an exemplary embodiment.

FIG. 10 illustrates an example of data and metadata arranged on the tape 23 after data migration is performed when the tape 23 is segmented. As in the case of FIG. 4, a plurality of wraps of the tape 23 are illustrated in FIG. 10. Again, each unshaded arrow indicates a direction in which data and metadata are written to the tape 23, while each black arrow indicates that a running direction of the tape 23 is reversed. For purposes of this example, the descending order of access frequency is assumed to be as follows: dm02, dm03, dm01, and dm04. First, metadata and data of the DM with dm-id "dm02" are written sequentially to segment #1 of wrap #0 in a forward direction. Next, a remaining portion of the data of the DM with dm-id "dm02" is written to segment #1 of wrap #1 in a reverse direction. Next, metadata and data of the DM with dm-id "dm03" are written sequentially to segment #1 of wrap #2 in the forward direction. If there is an additional portion of the data with d-id "d3", the additional portion is written to segment #1 of wrap #3 (not shown).

Subsequently, metadata and data of the DM with dm-id "dm01" are written sequentially to segment #2 of wrap #0 in a forward direction. Next, metadata and data of the DM with dm-id "dm04" are written sequentially to segment #2 of wrap #1 in a reverse direction. In sum, after data migration, unlike in the case of FIG. 4, data and metadata are recorded on the basis of logical associations illustrated in FIG. 3. Therefore, when data and metadata are sequentially read from the tape 23, there is no need to perform unnecessary positioning of the tape 23, and thus improved access performance can be achieved.

Although only one destination tape is presented here, a plurality of tapes 23 may serve as data migration destinations. If a plurality of destination tapes are used, segment #1 of the first destination tape is used first. After segment #1 of the first destination tape is used, segment #1 of the second destination tape is used. After segment #1 of the second destination tape is used, segment #1 of the third destination tape is used. This process is repeated until segment #1 of every destination tape is used. After segment #1 of every destination tape is used, segment #2 of the first destination tape and those of the destination tapes that follow may be used sequentially.

Thus, by preparing a plurality of destination tapes as described above, it is possible to provide larger memory space and to increase the amount of data and metadata that can be written to segment #1 having high access performance. Thus, the amount of data and metadata that can be accessed in a short time is increased. Moreover by using a plurality of destination tapes and by using segmentation, it is possible to provide appropriate memory space in accordance with access frequency to data on the destination tapes. For example, when there is only a small amount of frequently accessed data, the first segment may be defined to be located near the beginning of the tape 23. Conversely, when there is a large amount of frequently accessed data, the number of destination tapes may be increased, or the first segment may be defined to be larger where necessary. When access frequency varies, it may be possible to increase the number of segments such that pieces of data are grouped together on the basis of access frequency and written to appropriate segments.

In the data migration methods described above, data and metadata are arranged based on access frequency calculated in accordance with an exemplary embodiment. Therefore, it is possible to improve performance with respect to access to frequently accessed data and metadata.

As a method of implementing hierarchical storage for storing a large amount of data, an archive system for storing digital data may adopt a method that uses the tape 23 as secondary or tertiary storage. This is based on the assumption that there will be archived but frequently accessed data that is actually accessed. Under circumstances where pieces of such archived data are individually accessed, the various embodiments described herein contribute to improved performance with respect to access to data frequently accessed in the past.

Arrangement of data and metadata has been discussed on the basis of access performance with respect to reading data and metadata. However, in accordance with another exemplary embodiment, an arrangement method may be adopted that is not based on access performance.

Next, the tape drive 10 that performs the above-described operations will be described in further detail. Here, the dm access counter table is stored in the cartridge memory 24. FIG. 1 illustrates the tape drive 10 in which only one cartridge 20 can be loaded. Alternatively, two cartridges 20 can be loaded in the tape drive 10. When two cartridges 20 are loaded in the tape drive 10, it is unnecessary to perform a cartridge switch during data migration, since data can be migrated from one cartridge 20 (which may comprise the source tape) to another cartridge 20 (which may comprise the destination tape) within the tape drive 10.

Figure 11:
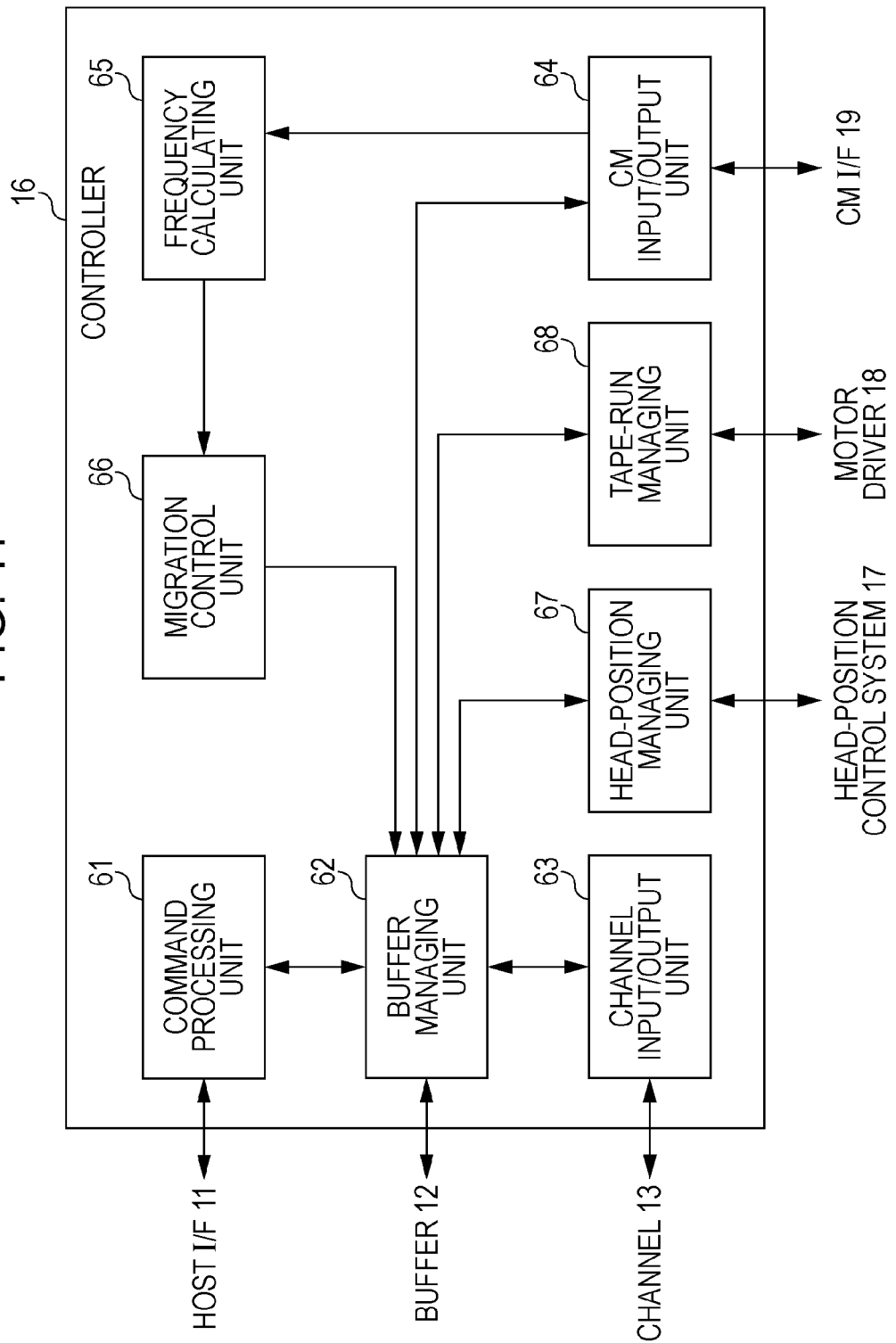
FIG. 11 is a block diagram illustrating a functional configuration of a controller in accordance with an exemplary embodiment.

FIG. 11 is a block diagram illustrating a functional configuration of the aforementioned controller 16 of the tape drive 10 in accordance with an exemplary embodiment. As illustrated, the controller 16 comprises a command processing unit 61, a buffer managing unit 62, a channel input/output unit 63, a cartridge memory input/output unit (hereinafter referred to as "CM input/output unit") 64, a frequency calculating unit 65, a migration control unit 66, a head-position managing unit 67, and a tape-run managing unit 68.

The command processing unit 61 receives a command from the host I/F 11. Examples of such command include a Write command to store data in the buffer 12, a synchronization command to write data stored in the buffer 12 to the tape 23, and a Read command to read data from the tape 23. When the command processing unit 61 receives a Write command, the buffer managing unit 62 prepares data in the buffer 12. When the command processing unit 61 receives a synchronization command, the buffer managing unit 62 reads data from the buffer 12 and outputs the data to the channel input/output unit 63. When the command processing unit 61 receives a Read command, if there is no corresponding data in the buffer 12, the buffer managing unit 62 directs the channel input/output unit 63 to read the corresponding data. Conversely, if there is corresponding data in the buffer 12, the buffer managing unit 62 returns the corresponding data to the host 200 via the command processing unit 61.

The channel input/output unit 63 outputs to the channel 13 data read from the buffer 12 by the buffer managing unit 62. Moreover, the channel input/output unit 63 outputs to the buffer managing unit 62 data received from the channel 13.

The CM input/output unit 64 writes information via the CM I/F 19 to the dm access counter table stored in the cartridge memory 24 and also reads information via the CM I/F 19 from the dm access counter table. In accordance with an exemplary embodiment, the CM input/output unit 64 is provided as an obtaining unit that obtains, for each of the pieces of data (i.e., data or metadata) recorded in the source tape, first information indicating the number of times any data has been read from the source tape after the piece of data was written to the source tape and second information indicating the number of times the piece of data has been read from the source tape. Furthermore, the CM input/output unit 64 is provided as an updating unit that updates the first information and the second information.

On the basis of the information read by the CM input/output unit 64, the frequency calculating unit 65 calculates access frequency with respect to each DM. In accordance with an exemplary embodiment, the frequency calculating unit 65 is provided as a tracking unit that tracks access frequency with respect to each DM.

The migration control unit 66 controls data migration on the basis of the access frequency calculated by the frequency calculating unit 65. That is, the migration control unit 66 directs the buffer managing unit 62 to read pieces of data and metadata from the source tape and to write the pieces of data and metadata to the destination tape in descending order of access frequency. Thus, the pieces of data and metadata are sequentially written to the destination tape in descending order of access frequency. In accordance with an exemplary embodiment, the migration control unit 66 is provided as a determining unit that determines recording positions of the pieces of data and metadata on the destination tape.

The head-position managing unit 67 outputs to the head-position control system 17 a signal for offsetting the positions of the write head 14*a* and read head 14*b* relative to the tape 23 in the width direction of the tape 23 (as noted above, the tape 23 as described here may refer to the source tape and/or the destination tape). Also, the head-position managing unit 67 obtains information about the current positions of the write head 14*a* and read head 14*b* in the width direction of the tape 23. The tape-run managing unit 68 outputs to the motor driver 18 a signal for causing the tape 23 to run in the forward direction and a signal for causing the tape 23 to run in the reverse direction.

Next, operations of the tape drive 10 in accordance with an exemplary embodiment will be described. First, a description will be given with respect to operation of the tape drive 10 when a Write command is transmitted from the host 200. The host 200 transmits to the archive device 100 a Write command with a dm-id, which associates data with metadata. In the archive device 100, the control mechanism 30 generates a d-id that identifies the data and a m-id that identifies the metadata, associates the d-id with the m-id, and registers them via dm-a. Additionally, the control mechanism 30 determines the cartridge 20 to which the data and the metadata are to be written, associates the d-id and the m-id with the cartridge 20, registers them via dm-1, and directs the accessor 40 to load the cartridge 20 in the tape drive 10. Then, the control mechanism 30 transmits the Write command with the dm-id, d-id, m-id, data, and metadata to the tape drive 10. As a result, the operation of the tape drive 10 starts.

Figure 12:
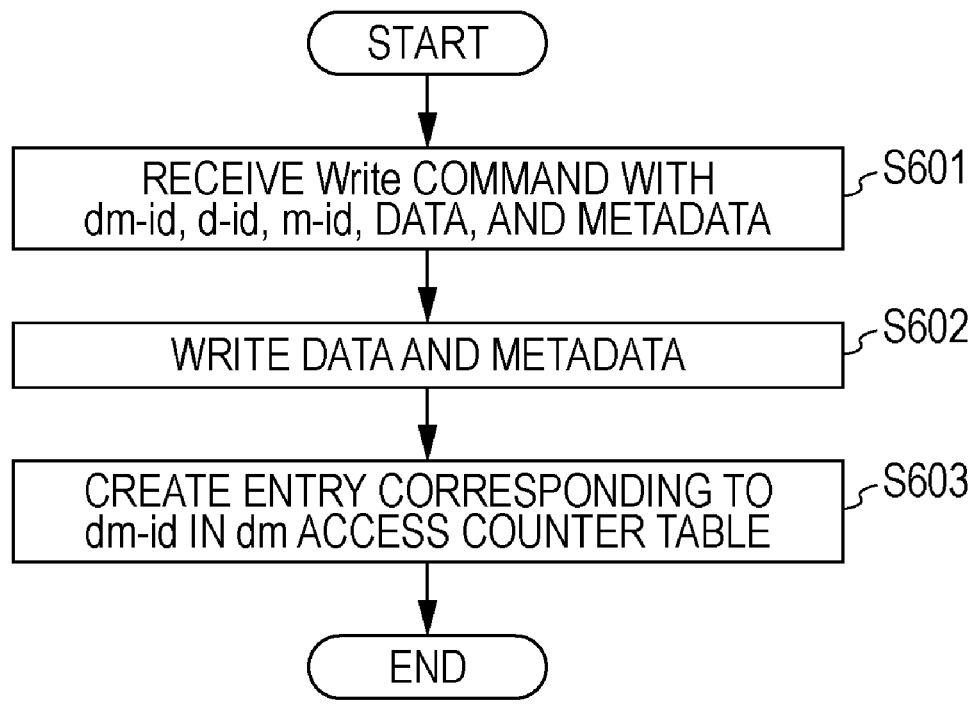
FIG. 12 is a flowchart illustrating data write operations performed by the controller in accordance with an exemplary embodiment.

FIG. 12 is a flowchart illustrating data write operations performed by the controller 16 of the tape drive 10 in accordance with an exemplary embodiment. First, the command processing unit 61 of the controller 16 receives via the host I/F 11 the Write command with the dm-id, d-id, m-id, data, and metadata (step S601). Then, the dm-id, d-id, m-id, data, and metadata are passed to the buffer managing unit 62 and are stored in the buffer 12 by the buffer managing unit 62.

Subsequently, the controller 16 writes the data and metadata to the tape 23 in the cartridge 20 loaded in the tape drive 10 (step S602). More specifically, in accordance with an instruction from the buffer managing unit 62, the head-position managing unit 67 controls the head-position control system 17 to adjust the position of the write head 14a in the width direction of the tape 23. Also, in accordance with an instruction from the buffer managing unit 62, the tape-run managing unit 68 controls the motor driver 18 to cause the tape 23 to run at write speed. Simultaneously, the buffer managing unit 62 reads the data and metadata from the buffer 12 and sends the data and metadata to the channel input/output unit 63, which outputs the data and metadata to the write head 14a via the channel 13. The channel input/output unit 63 receives from a servo head through the channel 13 information with respect to recording positions of the data and metadata in the longitudinal direction of the tape 23. The head-position managing unit 67 receives from the head-position control system 17 information with respect to recording positions of the data and metadata in the width direction of the tape 23. The recording position information is passed to the buffer managing unit 62, which in turn outputs the d-id and m-id read from the buffer 12 and the recording position information to the CM input/output unit 64. Then, the CM input/output unit 64 writes to the cartridge memory 24 via the CM I/F 19. Specifically, the CM input/output unit 64 writes information with respect to correspondence between the d-id and the recording position of the data and also writes information with respect to correspondence between the m-id and the recording position of the metadata. Thus, it is possible to read the data using the d-id as a key and to read the metadata using the m-id as a key.

Subsequently, the controller 16 creates an entry corresponding to the dm-id in the dm access counter table stored in the cartridge memory 24 (step S603). More specifically, the buffer managing unit 62 reads the dm-id from the buffer 12 and sends it to the CM input/output unit 64. Then, the CM input/output unit 64 writes a record including the dm-id to the cartridge memory 24 via the CM I/F 19.

Next, a description will be provided with respect to operation of the tape drive 10 when a Read command is transmitted from the host 200. Each time a request for reading data and metadata is received from the host 200, the cartridge 20 from which the data and metadata are to be read is mounted in the tape drive 10. The host 200 transmits a Read command with a dm-id to the archive device 100. In the archive device 100, on the basis of dm-a, the control mechanism 30 identifies the d-id and the m-id associated with each other via the dm-id. Additionally, on the basis of dm-1, the control mechanism 30 identifies the cartridge 20 associated with the d-id and the m-id. The control mechanism 30 directs the accessor 40 to load the identified cartridge 20 in the tape drive 10. Then, the control mechanism 30 transmits the Read command with the dm-id, d-id, and m-id to the tape drive 10. As a result, the operation of the tape drive 10 starts.

Figure 13:
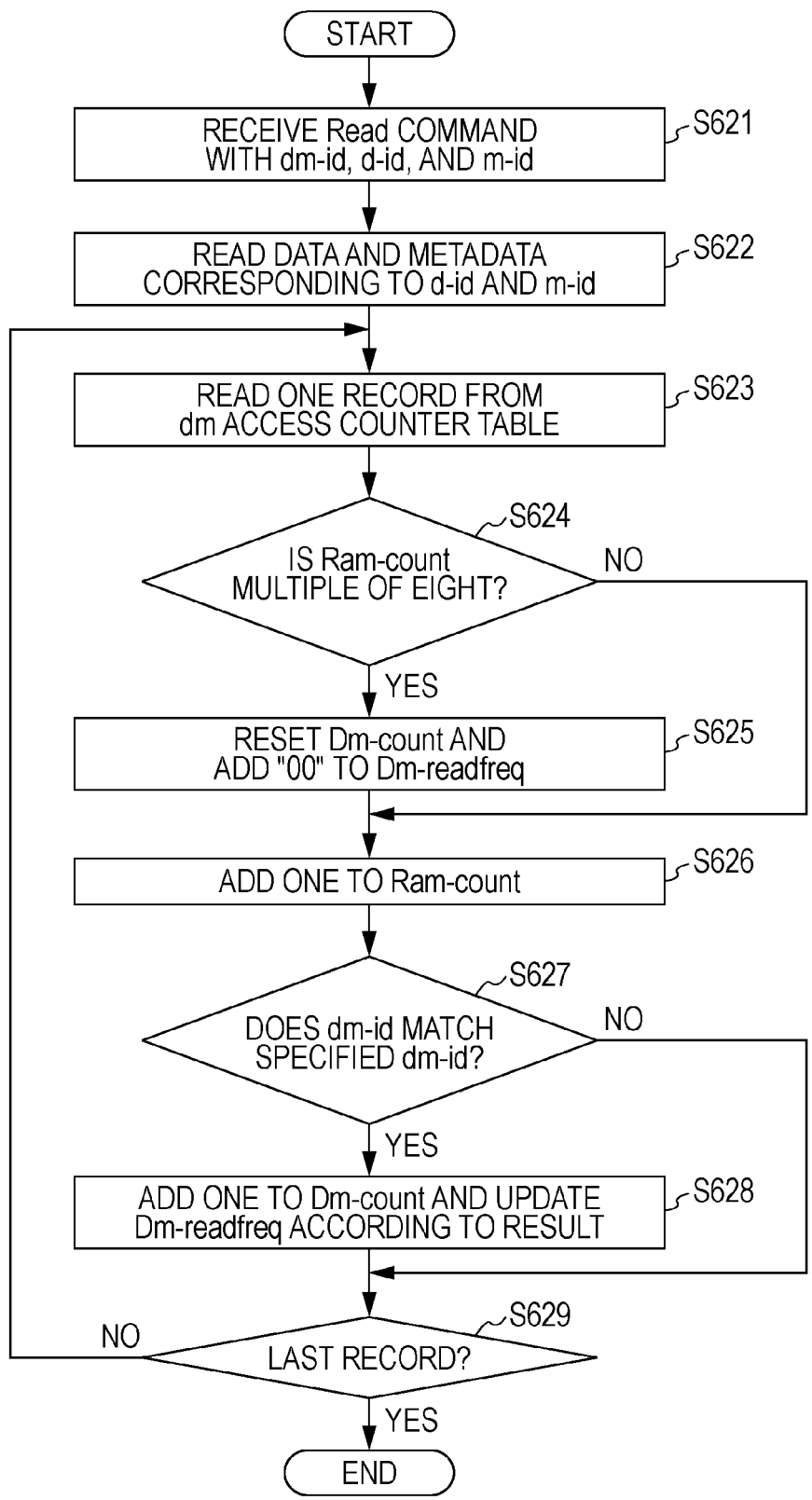
FIG. 13 is a flowchart illustrating data read operations performed by the controller in accordance with an exemplary embodiment.

FIG. 13 is a flowchart illustrating data read operations performed by the controller 16 of the tape drive 10 in accordance with an exemplary embodiment. First, the command processing unit 61 of the controller 16 receives via the host I/F 11 the Read command with the dm-id, d-id, and m-id (step S621). Then, the dm-id, d-id, and m-id are sent to the buffer managing unit 62.

Next, the controller 16 reads data corresponding to the d-id and metadata corresponding to the m-id from the tape 23 in the cartridge 20 loaded in the tape drive 10 (step S622). More specifically, in accordance with an instruction from the buffer managing unit 62, the head-position managing unit 67 controls the head-position control system 17 to adjust the position of the read head 14b in the width direction of the tape 23. Also, in accordance with an instruction from the buffer managing unit 62, the tape-run managing unit 68 controls the motor driver 18 to cause the tape 23 to run at read speed. Simultaneously, the channel input/output unit 63 obtains through the channel 13 the data and metadata read by the read head 14b and passes the obtained data and metadata to the buffer managing unit 62, which stores the data and metadata in the buffer 12. Then, the data and metadata stored in the buffer 12 are transmitted to the host 200.

Next, the controller 16 updates the dm access counter table stored in the cartridge memory 24. The updating process starts when the CM input/output unit 64 reads the dm access counter table from the cartridge memory 24 through the CM I/F 19 to a memory area of the CM input/output unit 64. More specifically, the CM input/output unit 64 reads one record from the dm access counter table (step S623). Then, the CM input/output unit 64 determines whether the Ram-count value included in the read record is a multiple of eight (step S624). If the Ram-count value is a multiple of eight, then this read mount operation is the beginning of a new set of eight read mount operations performed as a unit, and consequently the CM input/output unit 64 resets the Dm-count value to zero and adds "00" to the right end of the Dm-readfreq (step S625). Conversely, if the Ram-count value is not a multiple of eight, then the process proceeds to the step S626.

Next, the CM input/output unit 64 adds one to the Ram-count value included in the read record (step S626). Then, the CM input/output unit 64 determines whether the dm-id included in the read record matches the dm-id specified by the Read command (step S627). If the dm-id included in the read record matches the dm-id specified by the Read command, then the CM input/output unit 64 adds one to the Dm-count value and also updates the two bits at the right end of the Dm-readfreq in accordance with the result of the addition (step S628). The relationship between the Dm-count value and two bits of the Dm-readfreq may be as shown in FIG. 5. In such case, in accordance with the described Dm-readfreq representation scheme, if the Dm-count value obtained by adding one thereto is zero, then the two bits at the right end of the Dm-readfreq are updated to "00"; if the Dm-count value obtained by adding one thereto is one or two, then the two bits at the right end of the Dm-readfreq are updated to "01"; if the Dm-count value obtained by adding one thereto is any of three to five, then the two bits at the right end of the Dm-readfreq are updated to "10"; and if the Dm-count value obtained by adding one thereto is any of six to eight, then the two bits at the right end of the Dm-readfreq are updated to "11". The rule regarding how the Dm-readfreq is updated in accordance with the Dm-count value may be directly coded in the program or may be defined in a table external to the program so that the program can obtain the rule by referring to the table.

Next, the CM input/output unit 64 determines whether the current record read from the dm access counter table is the last record (step S629). If the current record is not the last record, then steps S623 to S628 are repeated for the next record. If the current record is the last one, then the process ends.

At any point in time after the dm access counter table is updated as described above, the tape drive 10 may perform processing for data migration. FIG. 14 is a flowchart illustrating data migration operations performed by the controller 16 of the tape drive 10 in accordance with an exemplary embodiment. The following description is based on the assumption that pieces of data and metadata are arranged on the destination tape in a manner such as that illustrated in FIG. 10.

First, the CM input/output unit 64 of the controller 16 reads the dm access counter table from the cartridge memory 24 via the CM I/F 19 and passes the dm access counter table information to the frequency calculating unit 65 (step S641). The frequency calculating unit 65 calculates access frequency for each dm-id using the first determining method or the second determining method described above, rearranges records in the dm access counter table in descending order of access frequency, and passes the dm access counter table information to the migration control unit 66 after the rearrangement (step S642).

Then, the migration control unit 66 migrates data from the source tape to the destination tape. More specifically, the migration control unit 66 first reads one record from the dm access counter table after the rearrangement and passes the read record to the buffer managing unit 62 (step S643). Then, the buffer managing unit 62 reads from the source tape data and metadata corresponding to the dm-id included in the read record (step S644). Specifically, in accordance with an instruction from the buffer managing unit 62, the head-position managing unit 67 controls the head-position control system 17 to adjust the position of the read head 14*b* in the width direction of the tape 23. Moreover, in accordance with an instruction from the buffer managing unit 62, the tape-run managing unit 68 controls the motor driver 18 to cause the tape 23 to run at read speed. Simultaneously, the channel input/output unit 63 obtains via the channel 13 the data and metadata read by the read head 14*b* and sends the obtained data and metadata to the buffer managing unit 62, which stores the data and metadata in the buffer 12. Note that the d-id and the m-id used as keys for reading the data and metadata corresponding to dm-id may be identified by referring to the control mechanism 30.

Next, the buffer managing unit 62 determines whether the stored data and metadata can be written to the current wrap on the destination tape (step S645). Since the channel input/output unit 63 receives from the servo head via the channel 13 information about recording positions of the data and metadata in the longitudinal direction of the tape 23, the buffer managing unit 62 makes such determination based on the information received by the channel input/output unit 63. If the buffer managing unit 62 determines that the data and metadata can be written to the current wrap, then the data and metadata are written to the destination tape (step S649). In accordance with an instruction from the buffer managing unit 62, the head-position managing unit 67 controls the head-position control system 17 to adjust the position of the write head 14*a* in the width direction of the tape 23. Also, in accordance with an instruction from the buffer managing unit 62, the tape-run managing unit 68 controls the motor driver 18 to cause the tape 23 to run at write speed. Simultaneously, the buffer managing unit 62 reads the data and metadata from the buffer 12 and sends the data and metadata to the channel input/output unit 63, which outputs the data and metadata to the write head 14*a* via the channel 13.

If it is determined that the data and metadata cannot be written to the current wrap, then it is determined whether the current wrap is the last wrap (step S646). Since the head-position managing unit 67 receives from the head-position control system 17 information with respect to recording positions of the data and metadata in the width direction of the tape 23, the buffer managing unit 62 makes such determination based on the information received by the head-position managing unit 67. If the current wrap is not the last wrap, then processing switches to the next wrap (step S647), and the data and metadata are written to the destination tape (step S649). The wrap switch is made by the head-position control system 17 under control of the head-position managing unit 67. Conversely, if the current wrap is the last wrap, then processing switches to wrap #1 in the next segment (step S648), and the data and metadata are written to the destination tape (step S649). The segment switch is made by the motor driver 18 under control of the tape-run managing unit 68.

Then the migration control unit 66 determines whether the current record read from the dm access counter table is the last record (step S650). If the current record is not the last record, then steps S643 to S649 are repeated for the next record. Conversely, if the current record is the last record, then the process ends.

In accordance with the above-described exemplary embodiment, data migration is performed in the tape drive 10 in which two cartridges 20 can be loaded simultaneously, and thus there is no need to replace one cartridge 20 with another. Alternatively, control of such data migration may be performed by the control mechanism 30. In such case, the control mechanism 30 may control two tape drives 10 to perform data migration, with each of the two tape drives 10 accommodating one cartridge 20.

The various embodiments described herein may be realized by hardware alone, software alone, or both hardware and software. The various embodiments can be implemented as a computer, a data processing system, and a computer program. The computer program can be stored in a computer-readable medium and provided. The medium can be an electronic, magnetic, optical, electromagnetic, infrared, or semiconductor system (or apparatus or device), or a propagation medium. Examples of the computer-readable medium include a semiconductor or solid state memory, a magnetic tape, a removable computer diskette, a random access memory (RAM), a read-only memory (ROM), a rigid magnetic disk, and an optical disk. Current examples of the optical disk include a compact disc read-only memory (CD-ROM), a compact disc read/write (CD-R/W), a digital versatile disc (DVD), and a Blu-ray disc (BD).

Although the various embodiments have been described using the foregoing exemplary embodiments, the technical scope of the various embodiments is not limited to them. It will be apparent to those skilled in the art that various modifications and alternatives can be adopted without departing from the spirit and scope of the various embodiments.

The invention claimed is:

1. A device for migrating pieces of data from a first recording location to a second recording location, the device comprising:
an obtaining unit for obtaining, for each of the pieces of data, first information indicating the number of times any data has been read from the first recording location after the piece of data is written to the first recording location and second information indicating the number of times the piece of data has been read from the first recording location;
a tracking unit for tracking access frequency with respect to each of the pieces of data using the first information and the second information; and
a determining unit for determining recording positions of each of the pieces of data in the second recording location based on the access frequency tracked by the tracking unit.

2. The device according to claim 1, wherein the first recording location is a first recording medium, and wherein the second recording location is a second recording medium.

3. The device according to claim 1, wherein the first recording location is a first region within a recording medium, and wherein the second recording location is a second region within the recording medium.

4. The device according to claim 1, further comprising an updating unit for updating the first information and the second information corresponding to a piece of data when the piece of data has been read from the first recording location.

5. The device according to claim 4, wherein each of the pieces of data comprises primary data and metadata corresponding to the primary data, and wherein the updating unit determines that a piece of data has been read when at least one of the primary data and the metadata of the piece of data has been read from the first recording location.

6. The device according to claim 1, further comprising a managing unit for reading each of the pieces of data from the first recording location and for writing each of the pieces of data to the second recording location at the recording positions determined by the determining unit.

7. The device according to claim 1, wherein the first information corresponding to a piece of data indicates the number of times any data has been read from the first recording location after the piece of data is written to the first recording location by indicating the number of times a medium comprising the first recording location has been mounted in a storage unit after the piece of data is written to the first recording location.

8. The device according to claim 1, wherein the tracking unit tracks the access frequency with respect to each of the pieces of data via a ratio of the number of times indicated by the second information to the number of times indicated by the first information.

9. The device according to claim 1, wherein the tracking unit tracks the access frequency for a piece of data only if the number of times indicated by the first information corresponding to the piece of data is within a predetermined range.

10. The device according to claim 1, wherein the tracking unit tracks the access frequency for a piece of data only with respect to data obtained when the number of times indicated by the first information corresponding to the piece of data is within a predetermined range.

11. The device according to claim 1, wherein the second information corresponding to a piece of data comprises information indicating a read history with respect to the piece of data, the read history being represented by a plurality of bit values.

12. The device according to claim 11, wherein the number of times any data has been read from the first recording location is represented by M, and wherein the number of times the piece of data has been read is represented by N of the plurality of bit values, where N is less than M.

13. The device according to claim 1, wherein the determining unit determines the recording positions of each of the pieces of data in the second recording location such that frequently accessed data is recorded at a first recording position in the second recording location and less frequently accessed data is recorded at a second recording position in the second recording location, the second recording position being a position at which the time required to read data from the second recording location is longer than that at the first recording position.

14. The device according to claim 13, wherein the second recording location is a tape medium from which data is read in a direction from a first end thereof to a second end thereof, and wherein the second recording position is closer to the second end than the first recording position is to the second end.

15. The device according to claim 13, wherein:
the second recording location is a tape medium from which data is read in a direction from a first end thereof to a second end thereof, the tape medium having a plurality of regions formed by dividing the tape medium at least one position in a longitudinal direction;
the first recording position is a position within a first region of the plurality of regions; and
the second recording position is a position within a second region of the plurality of regions, the second region being closer to the second end than the first region is to the second end.

16. A method for migrating pieces of data recorded in a first recording location to a second recording location, the method comprising:
obtaining, for each of the pieces of data, first information indicating the number of times any data has been read from the first recording location after the piece of data is written to the first recording location and second information indicating the number of times the piece of data has been read from the first recording location;
tracking access frequency with respect to each of the pieces of data using the first information and the second information; and
determining a recording position for each of the pieces of data in the second recording location based on the tracked access frequency.

17. The method according to claim 16, wherein the first recording location is a first recording medium, and wherein the second recording location is a second recording medium.

18. The method according to claim 16, wherein the first recording location is a first region within a recording medium, and wherein the second recording location is a second region within the recording medium.

19. A computer program product for migrating pieces of data recorded in a first recording location to a second recording location, the computer program product comprising a non-signal computer-readable storage medium having computer-readable program code instructions stored therein comprising:
a first set of computer instructions for obtaining, for each of the pieces of data, first information indicating the number of times any data has been read from the first recording location after the piece of data is written to the first recording location and second information indicating the number of times the piece of data has been read from the first recording location;

a second set of computer instructions for tracking access frequency with respect to each of the pieces of data using the first information and the second information; and a third set of computer instructions for determining a recording position for each of the pieces of data in the second recording location based on the tracked access frequency.

20. The computer program product according to claim 19, wherein the first recording location is a first recording medium, and wherein the second recording location is a second recording medium.

21. The computer program product according to claim 19, wherein the first recording location is a first region within a recording medium, and wherein the second recording location is a second region within the recording medium.

* * * * *